United States Patent
Gutelius et al.

(10) Patent No.: US 10,989,636 B2
(45) Date of Patent: Apr. 27, 2021

(54) SPECIMEN CONTAINERS AND RELATED METHODS

(71) Applicant: CooperSurgical, Inc., Trumbull, CT (US)

(72) Inventors: Patrick N. Gutelius, Monroe, CT (US); Derek R. Kulakowski, Oxford, CT (US); Timothy Stanhope, Cornwall (GB); Simon W. H. Conisbee, Cornwall (GB); Sarthak Sawarkar, Summit, NJ (US); Joseph Gordon, Mansfield, MA (US); Jason Pancoast, Windham, NH (US); John Glaberson, Sandy Hook, CT (US)

(73) Assignee: CooperSurgical, Inc., Trumbull, CT (US)

(*) Notice: Subject to any disclaimer, the term of this patent is extended or adjusted under 35 U.S.C. 154(b) by 266 days.

(21) Appl. No.: 16/197,439

(22) Filed: Nov. 21, 2018

(65) Prior Publication Data

US 2019/0162639 A1 May 30, 2019

Related U.S. Application Data

(60) Provisional application No. 62/591,424, filed on Nov. 28, 2017.

(51) Int. Cl.
*G01N 1/42* (2006.01)
*G01N 1/28* (2006.01)
(Continued)

(52) U.S. Cl.
CPC ............. *G01N 1/42* (2013.01); *A01N 1/0242* (2013.01); *A01N 1/0268* (2013.01); *G01K 13/12* (2013.01);
(Continued)

(58) Field of Classification Search
CPC .. G01N 1/42; G01N 1/2813; G01N 35/00029; G01N 2035/00138; G01N 1/28;
(Continued)

(56) References Cited

U.S. PATENT DOCUMENTS 8,633,023 B2 1/2014 Du et al.
9,538,745 B2 1/2017 He et al.
(Continued)

FOREIGN PATENT DOCUMENTS

WO WO-2004042341 A2 * 5/2004 ............... A01N 1/02
WO WO 2011/070973 6/2011
(Continued)

OTHER PUBLICATIONS

Iinaba et al., In-straw Cryoprotectant Dilution for Bovine Embryos Vitrified Using Cryotop; Apr. 2011, Journal of Reproduction and Development, vol. 57, pp. 437-443. (Year: 2011).*

(Continued)

*Primary Examiner* — Emmanuel E Duke
(74) *Attorney, Agent, or Firm* — Fish & Richardson P.C.

(57) ABSTRACT

A specimen container configured for cryogenic processing of a specimen includes an elongate member, a first specimen processing medium contained within a lumen of the elongate member at a first position, a second specimen processing medium contained within the lumen of the elongate member at a second position located distal to the first position, and a barrier positioned between the first and second specimen processing mediums such that the first and second specimen processing mediums are spaced apart from each other within the lumen of the elongate member.

29 Claims, 22 Drawing Sheets

(51) Int. Cl.
*G01N 35/00* (2006.01)
*A01N 1/02* (2006.01)
*G01K 13/12* (2006.01)

(52) U.S. Cl.
CPC ..... *G01N 1/2813* (2013.01); *G01N 35/00029* (2013.01); *G01N 2035/00138* (2013.01)

(58) Field of Classification Search
CPC ...... G01N 1/02; A01N 1/0242; A01N 1/0268; A01N 1/0284; A01N 1/0257; G01K 13/12
See application file for complete search history.

(56) References Cited

U.S. PATENT DOCUMENTS

| | | | |
|---|---|---|---|
| 9,723,831 | B2 | 8/2017 | Sun et al. |
| 2007/0037271 | A1 | 2/2007 | Huang et al. |
| 2009/0186405 | A1* | 7/2009 | Chin .................... G01N 1/42 435/307.1 |
| 2010/0311036 | A1 | 12/2010 | He |
| 2011/0129811 | A1 | 6/2011 | Tao |
| 2011/0196358 | A1* | 8/2011 | Criado Scholz ..... A01N 1/0268 606/20 |
| 2011/0250690 | A1* | 10/2011 | Craig ................. B01F 15/0404 435/404 |
| 2014/0342454 | A1 | 11/2014 | Burbank et al. |
| 2015/0237848 | A1* | 8/2015 | Schmitt ............... A01N 1/0268 435/307.1 |
| 2015/0313211 | A1* | 11/2015 | Ng ...................... A01N 1/0268 435/374 |
| 2016/0102286 | A1 | 4/2016 | Toner et al. |
| 2016/0174545 | A1* | 6/2016 | Parra .................. A01N 1/0257 435/284.1 |
| 2018/0002649 | A1 | 1/2018 | Pedersen |

FOREIGN PATENT DOCUMENTS

| | | |
|---|---|---|
| WO | WO 2014/001819 | 1/2014 |
| WO | WO 2017/109153 | 6/2017 |
| WO | WO 2017/122210 | 7/2017 |

OTHER PUBLICATIONS

The International Search Report and Written Opinion of the International Searching Authority for International Application No. PCT/US2018/062194 dated Mar. 14, 2019.

Campos-Chillon et al, "In vitro assessment of a direct transfer vitrification procedure for bovine embryos", *Theriogenology*, vol. 65, No. 6, pp. 1200-1214 (Apr. 1, 2006).

Payne, "Efficiency of two cryopreservation methods using direct in-straw rehydration after repeated vitrification of mouse embryos", *A Senior Project presented to the Faculty of the Animal Science Department, College of Agriculture California Polytecchnic State University*, San Luis Obispo (Jun. 2012).

Yasushi et al., "In-straw Cryoprotectant Dilution for Bovine Embryos Vitrified Using Cryotop", *Journal of Reproduction and Development*, vol. 57, No. 4, pp. 437-443 (Apr. 5, 2011).

FertileSAFE, Where Fertifility and Cryopreservation Meet, https://www.fertilesafe.com/sarah (2015).

Miri TL Time-Lapse Incubator for IVF, at this link: http://medical.escoglobal.com/images/product-pdf/9010338-MIRI-TL-Combined-Catalogue-A4-vA.pdf . Retrieved on Dec. 13, 2018.

New IVF Products to unveil!, http://medical.escoglobal.com/news/new-ivf-products-to-unveil-at-eshre-2016/71/en/ (2016).

Photos of an automatic vitrification machine developed by Esco Medical and demonstrated at the American Society of Reproductive Medicine Scientific Congress & Expo on Oct. 6, 2018 in Denver, Colorado.

Photo of an automatic vitrification machine developed by Esco Medical and demonstrated at the European Society of Human Reproduction and Embryology meeting on Jul. 4, 2017 in Geneva, Switzerland.

* cited by examiner

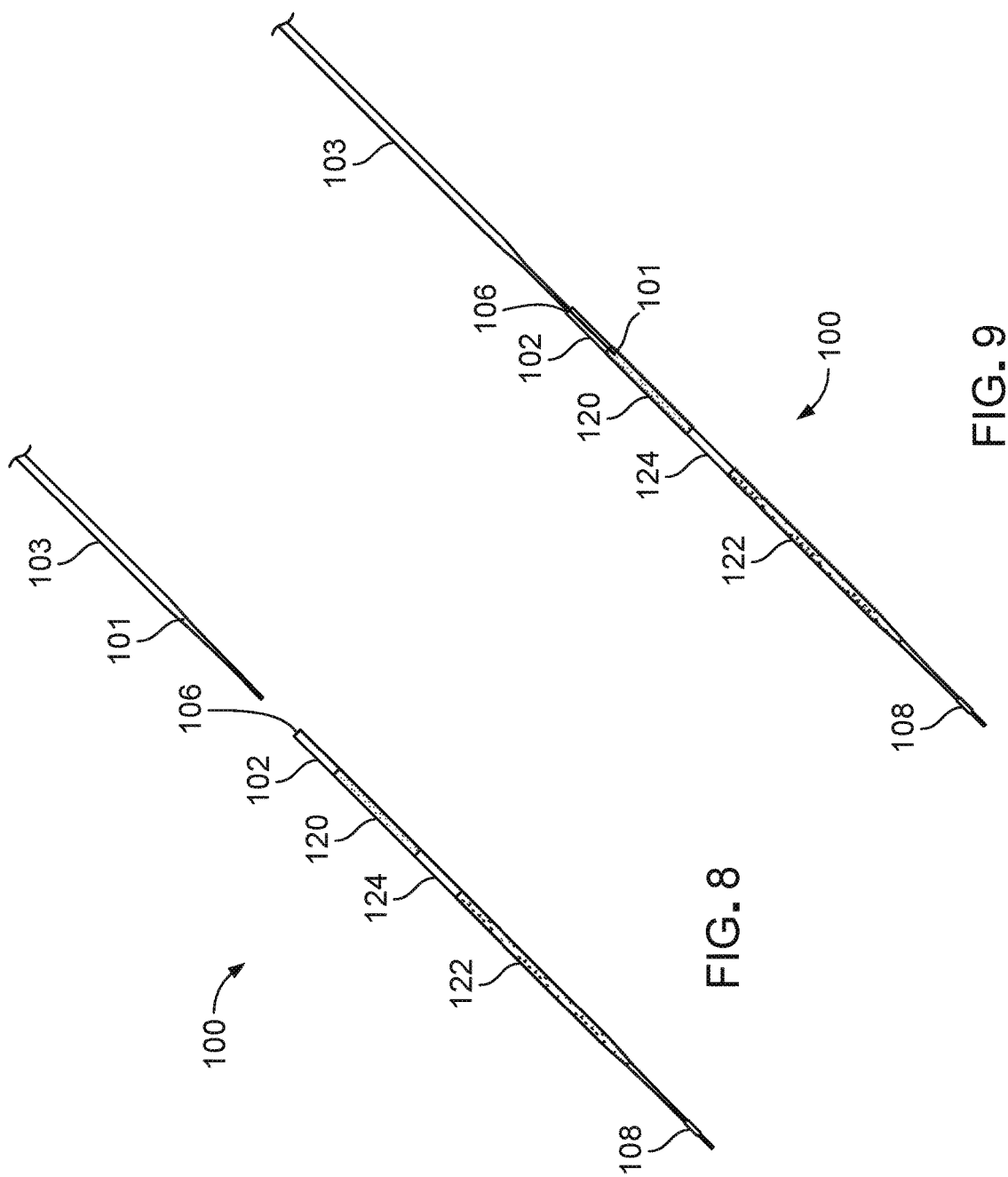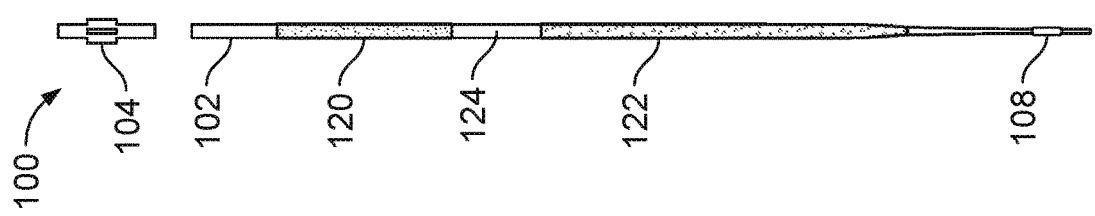

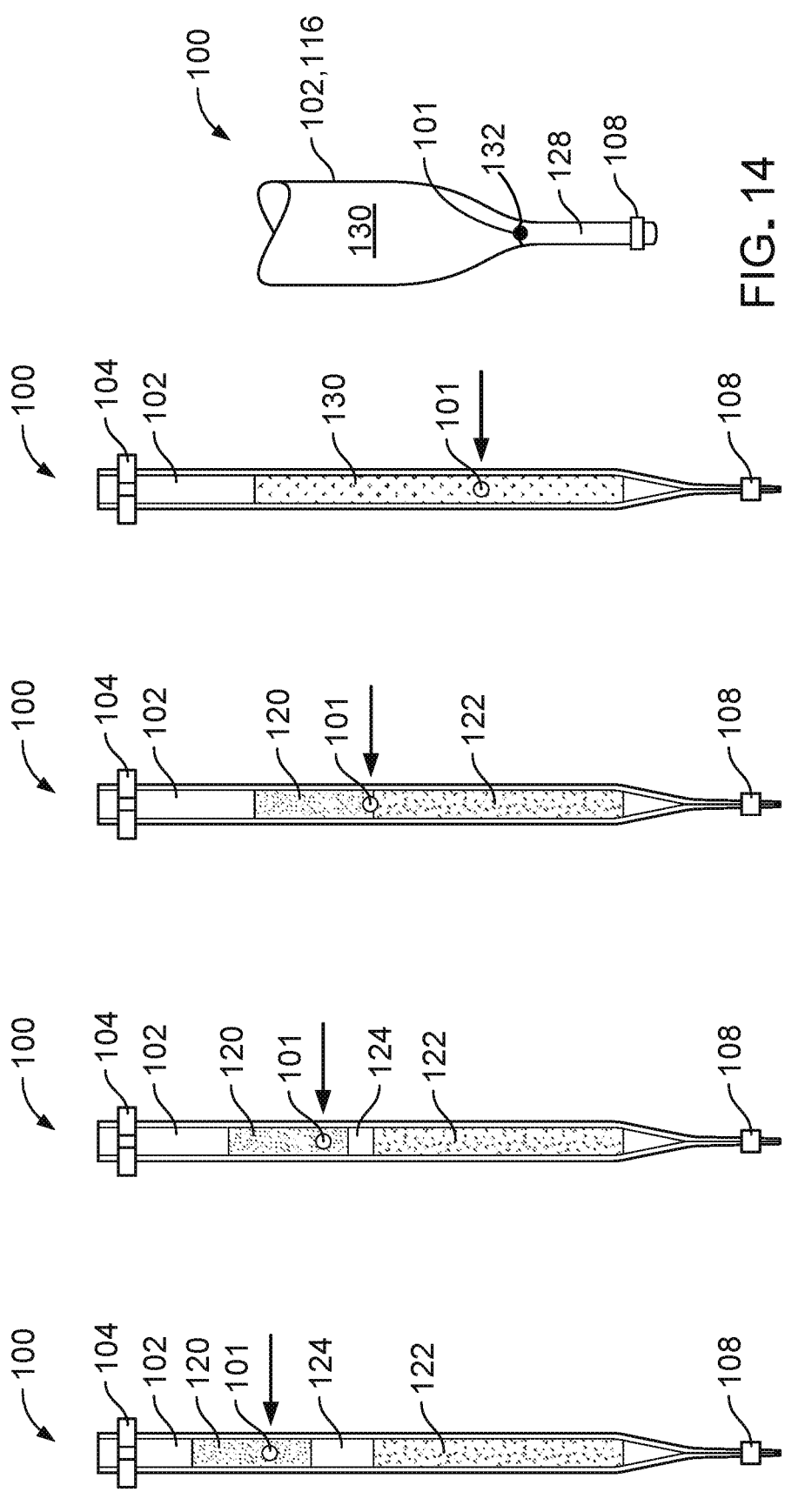

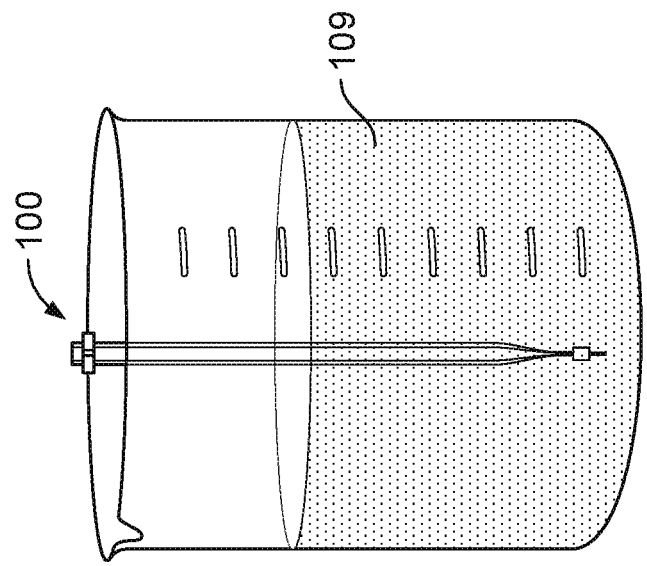
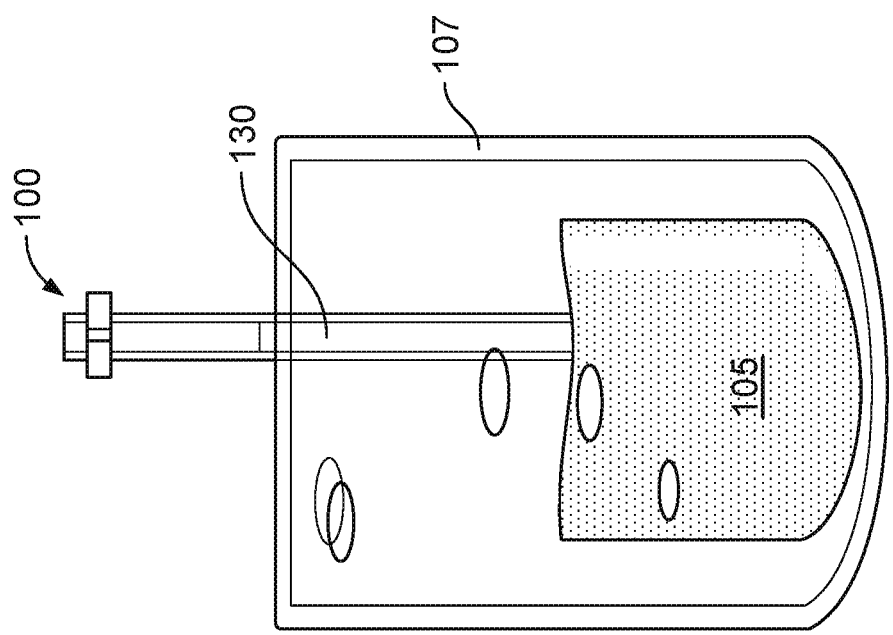

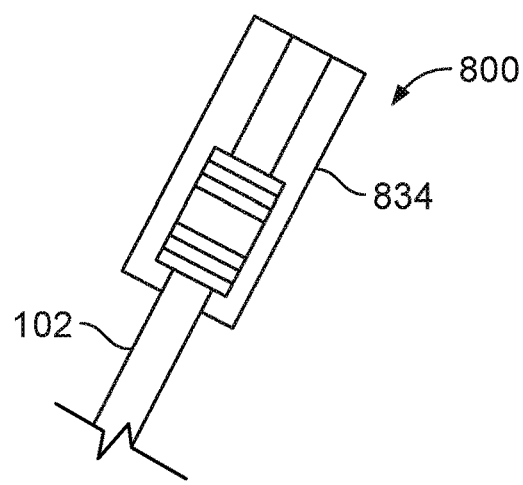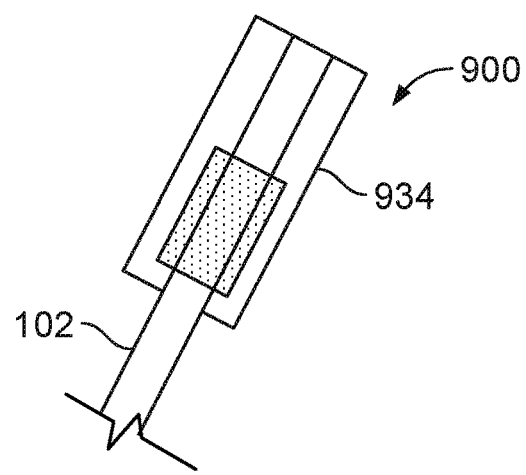
FIG. 25　　　　　　　　FIG. 26
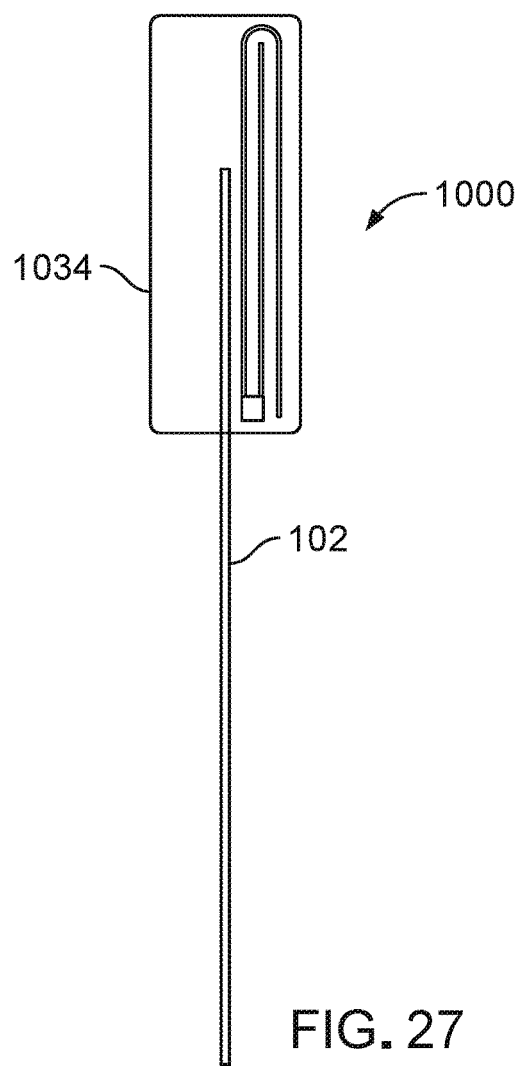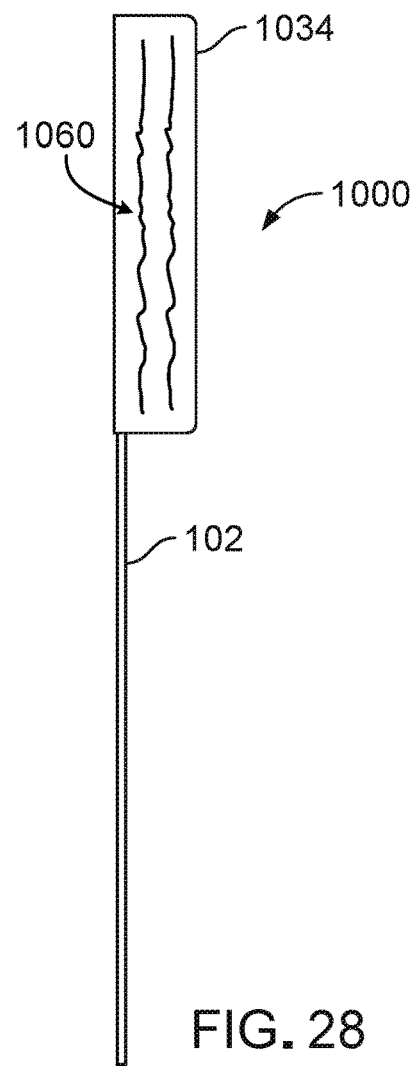
FIG. 27　　　　　　　　FIG. 28

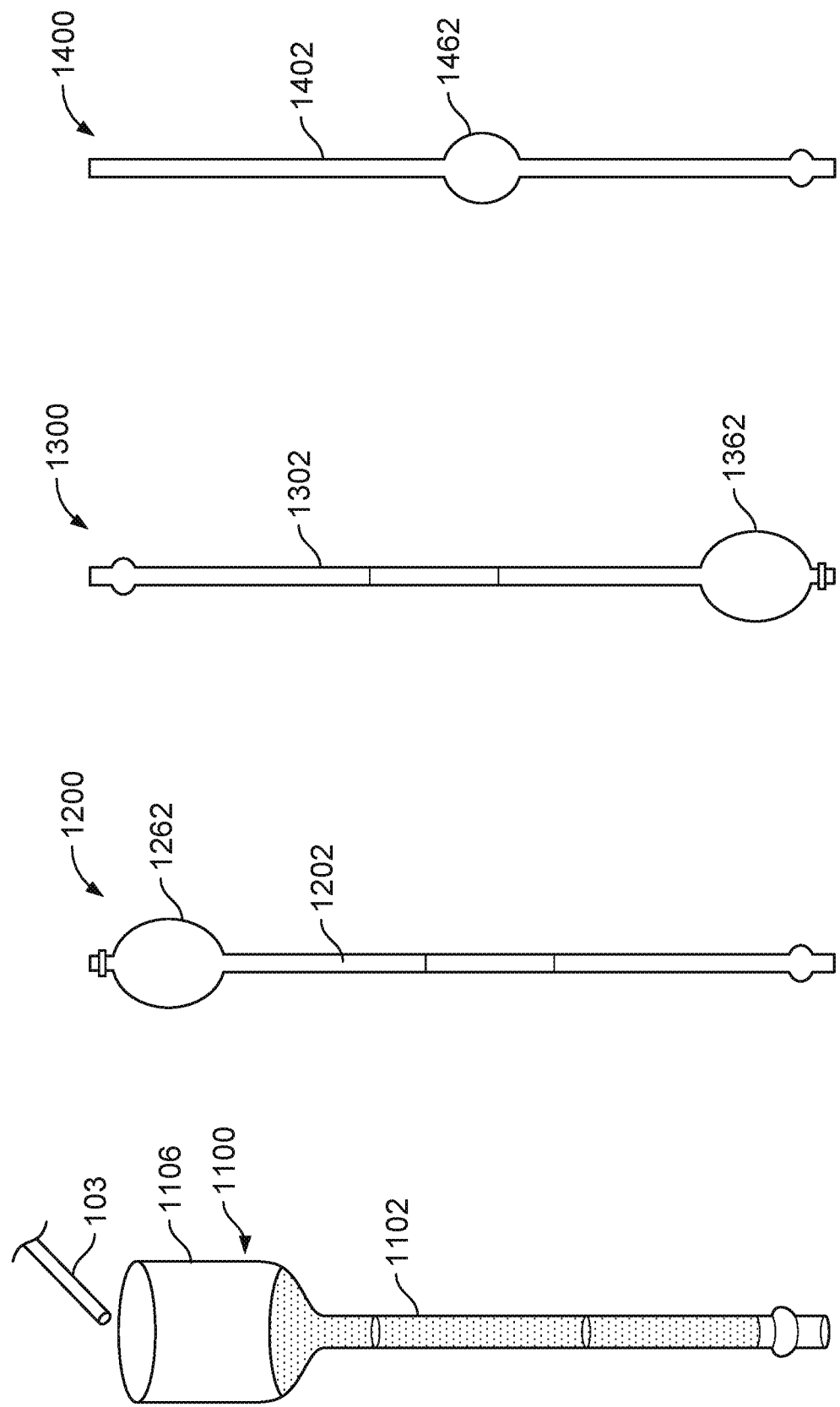

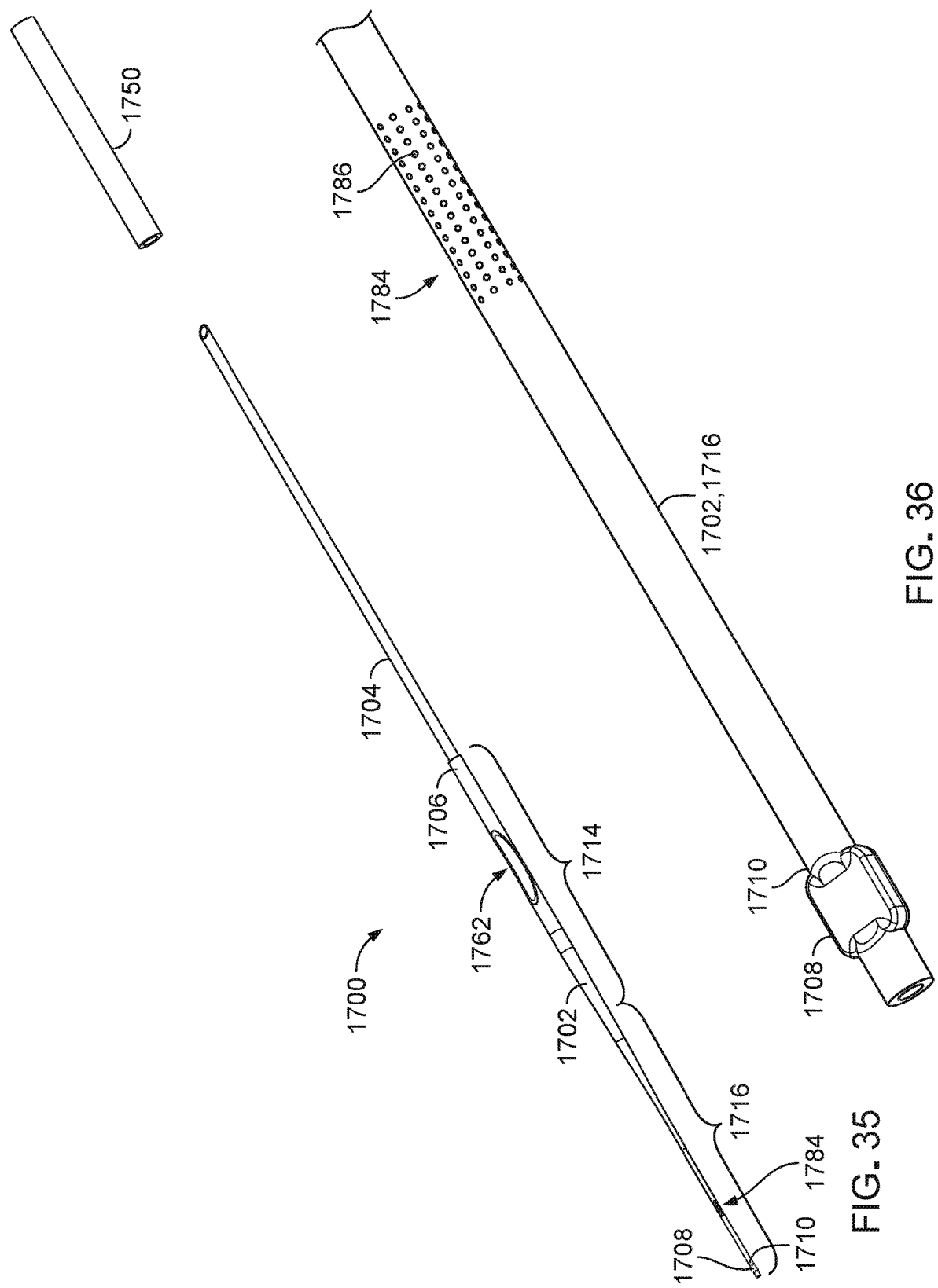

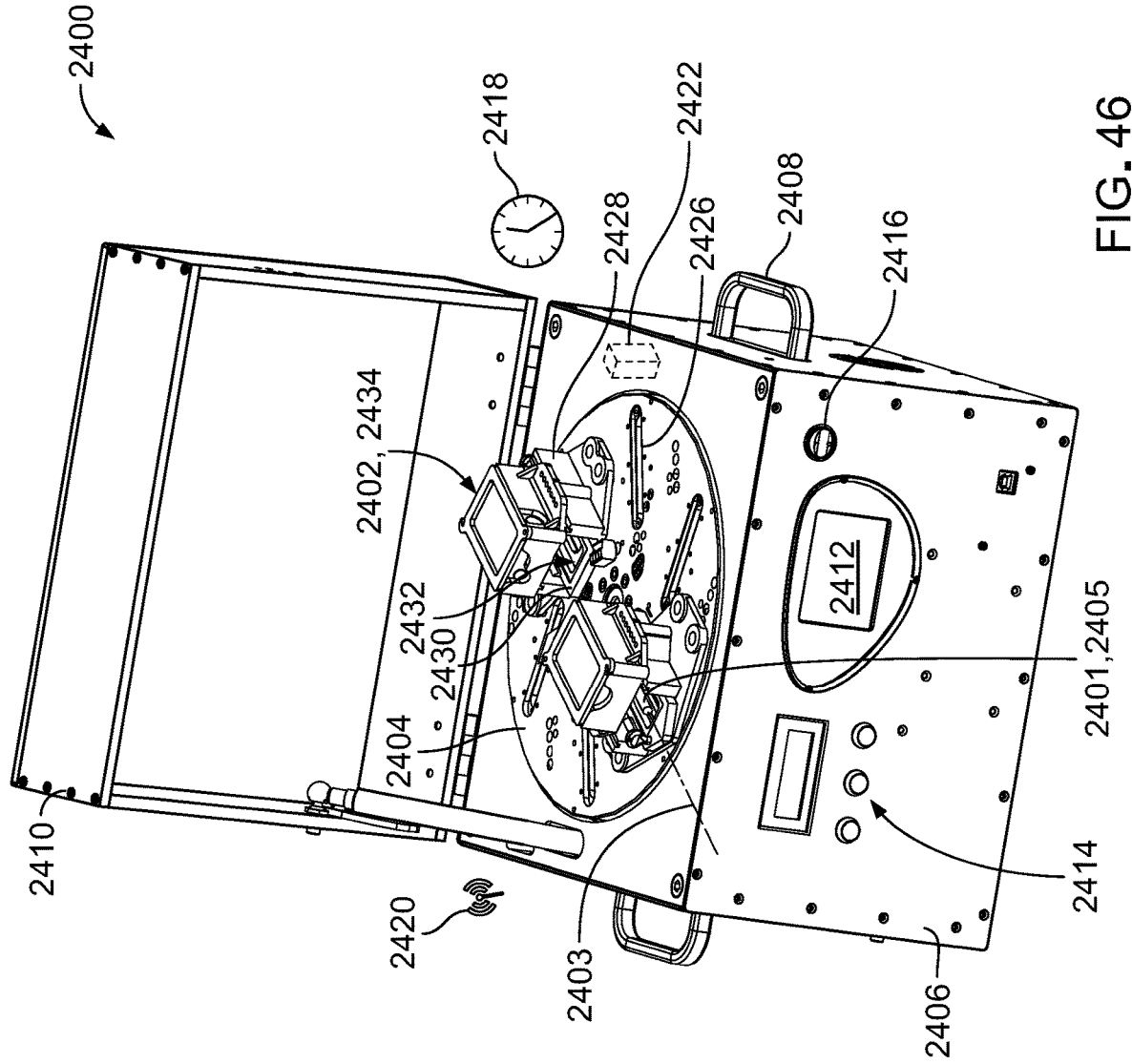

SPECIMEN CONTAINERS AND RELATED METHODS

CROSS-REFERENCE TO RELATED APPLICATIONS

This application claims priority to U.S. Provisional Patent Application No. 62/591,424, filed on Nov. 28, 2017, the entire contents of which are incorporated herein by reference.

TECHNICAL FIELD

This disclosure relates to specimen containers and related methods of vitrifying specimens carried within the specimen containers.

BACKGROUND

Low temperature specimen carriers, such as cryopreservation devices, are used in the field of assisted reproductive technology (ART) to store and preserve living reproductive specimens (e.g., oocytes, embryos, and blastocysts). Cryopreservation refers to a process in which specimens are preserved over extended periods of time by cooling to sub-zero temperatures. For example, a cryopreservation device can house and support specimens undergoing vitrification, which is the rapid transition of a substance from a liquid phase to a solid phase (e.g., glass) without the formation of ice crystals within cells of the specimen.

Typical protocols for vitrifying a reproductive specimen include accessing a carrier (e.g., a petri dish, a test tube, or flask) in which the specimen is disposed multiple times to expose the specimen to multiple processing solutions. Such protocols further include subsequently transferring the specimen to a cryopreservation device, and then exposing the cryopreservation device, containing the specimen therein, to a cooling medium (e.g., liquid nitrogen) to cause the cells of the specimen to rapidly cool to a glass state before ice crystals can form within the cells. The cryopreservation device can be stored in the cooling medium until the specimen is ready to be used in reproductive procedures.

SUMMARY

In general, this disclosure relates to specimen containers configured for preparation and storage of a specimen in a low temperature substance and relates to associated methods. Such specimen containers can be used for preserving living specimens in a viable state over a prolonged period of time.

In one aspect, a specimen container configured for cryogenic processing of a specimen includes an elongate member, a first specimen processing medium contained within a lumen of the elongate member at a first position, a second specimen processing medium contained within the lumen of the elongate member at a second position located distal to the first position, and a barrier positioned between the first and second specimen processing mediums such that the first and second specimen processing mediums are spaced apart from each other within the lumen of the elongate member.

Embodiments may include one or more of the following features.

In some embodiments, the elongate member is a capillary tube.

In some embodiments, the first and second specimen processing mediums are spaced apart from each other by the barrier within the lumen of the elongate member in a preloaded configuration of the specimen container.

In certain embodiments, the elongate member includes a first portion having constant width and a second portion having a variable width.

In certain embodiments, the second portion is a tapered portion.

In some embodiments, the first specimen processing medium is an equilibration solution.

In certain embodiments, the second specimen processing medium is a vitrification solution.

In some embodiments, the second specimen processing medium is denser than the first specimen processing medium.

In certain embodiments, the first specimen processing medium has a volume of about 1 µL to about 50 µL.

In some embodiments, the second specimen processing medium has a volume of about 1 µL to about 50 µL.

In certain embodiments, the specimen container further includes one or more additional specimen processing mediums.

In some embodiments, the barrier is a fluid.

In certain embodiments, the fluid includes air.

In some embodiments, the barrier includes a valve.

In certain embodiments, the barrier is an inert solid that undergoes a solid to liquid phase change at a temperature of about 10° C.

In some embodiments, the barrier, in a liquid phase, is less dense than the first and second specimen processing mediums.

In certain embodiments, the barrier includes a clamping mechanism disposed external to the elongate member.

In some embodiments, the elongate member includes a flexible tube.

In some embodiments, a diameter of the elongate member varies in a stepwise manner along an axis of the elongate member.

In certain embodiments, the specimen container further includes an electronic identification label.

In some embodiments, a proximal end of the elongate tube and is wider than a central portion of the elongate tube.

In certain embodiments, the elongate tube defines a sidewall opening located proximal to the first processing medium.

In certain embodiments, the specimen container further includes a plug configured to fit within the lumen of the elongate tube and a specimen carrier that extends from the plug.

In some embodiments, one or both of the first and second processing mediums includes magnetic nanoparticles.

In certain embodiments, the specimen container is formed of a material that can mechanically withstand a temperature of about −196° C. or less for at least about 15 years.

In another aspect, a cryogenic device includes the specimen container and a handle configured to house the specimen container.

In another aspect, a vitrification system includes a processing station that includes a receptacle configured to securely hold a specimen container and an imaging system disposed above the receptacle for visualizing a specimen within the specimen container. The vitrification system further includes a rotatable platform to which the processing station is secured for applying a centripetal force to the specimen within the specimen container. The specimen container is configured for cryogenic processing of the specimen. The specimen container includes an elongate member, a first specimen processing medium contained within a lumen of the elongate member at a first position, a second specimen processing medium contained within the lumen of the elongate member at a second position located distal to the first position, and a barrier positioned between the first and second specimen processing mediums such that the first and second specimen processing mediums are spaced apart from each other within the lumen of the elongate member In another aspect, a method of cryogenically processing a specimen within a specimen container includes depositing the specimen within a lumen of the specimen container, exposing the specimen to a first processing medium contained within the lumen for a predetermined period of time, forcing the specimen distally through the first processing medium and toward a second processing medium spaced apart from the first processing medium and contained within the lumen, exposing the specimen to the second processing medium, and forcing the specimen distally through the second processing.

Embodiments may include one or more of the following features.

In some embodiments, the method further includes passing the specimen through a proximal opening in the specimen container.

In certain embodiments, the proximal opening is located at an end of the specimen container.

In some embodiments, the proximal opening is located along a sidewall of the specimen container.

In certain embodiments, the method further includes sealing the proximal opening of the specimen container after depositing the specimen within the lumen of the specimen container.

In some embodiments, the method further includes forcing the first processing medium through a barrier that initially separates the first processing medium from the second processing medium.

In certain embodiments, the method further includes displacing the barrier.

In some embodiments, the method further includes merging the first and second processing mediums to form a combined processing medium within the lumen of the elongate member.

In certain embodiments, the predetermined period of time is a first predetermined period of time, and the method further includes exposing the specimen to the combined processing medium for a second predetermined period of time.

In some embodiments, the method further includes spinning the specimen container about an axis of the specimen container while the specimen is contained within the specimen container.

In certain embodiments, the method further includes revolving the specimen container around a revolution axis while the specimen is contained within the specimen container.

In some embodiments, the first processing medium includes magnetic nanoparticles.

In certain embodiments, the method further includes applying a magnetic force to the magnetic nanoparticles.

In some embodiments, the method further includes immersing the specimen container within liquid nitrogen.

In certain embodiments, the method further includes exposing the specimen to a temperature of about −196° C. or less while the specimen is disposed within the specimen container.

In some embodiments, the method further includes vitrifying the specimen within the specimen container.

In certain embodiments, the method further includes thawing the specimen within the specimen container.

In some embodiments, the method further includes dispelling the specimen from the specimen container.

In certain embodiments, the method further includes reading an electronic identification label of the specimen container.

In some embodiments, the specimen includes one or more reproductive cells.

Embodiments may provide one or more of the following advantages.

The specimen container is designed to exploit mass properties of a specimen with respect to mass properties of various processing media. Accordingly, the lumen of the specimen container is internally preloaded with multiple fluids to which the specimen will be exposed during a cryopreparation process. In particular, the specimen container can be preloaded with an equilibration solution of relatively low density and a vitrification solution of relatively high density that are separated by a separation fluid 124. Such separation of the equilibration solution and the vitrification solution enables appropriate processing of the specimen (e.g., sequential exposure of the specimen to particular solutions for desired periods of time) during vitrification protocols.

Furthermore, owing to a preloaded state of the equilibration solution and the vitrification solution within the specimen container, a specimen can be prepared for vitrification within a single, isolated environment (e.g., the lumen of the specimen container) without being exposed to contamination, mechanical damage (e.g., from a micropipette or other specimen holding or fluid delivery device), or other accidental mishandling that may otherwise occur when a container that houses a specimen is accessed multiple times to deliver and remove various processing mediums or when a specimen is moved to various containers during an ART process. In this regard, the specimen containers discussed herein are easy-to-use devices that enable a user to simply deposit a specimen within a container and then place the container within a system console or a centrifuge to carry out certain stages of an ART protocol. Accordingly, the user can avoid steps involving adding and removing multiple different fluids to a specimen container. Additionally, the specimen container has as geometry that optimizes storage density, such that the specimen container occupies little space. A construction of the specimen container also has a low thermal capacity, such that the specimen container experiences raid cooling and warming rates, which promotes wellness of tissue specimens contained therein.

DESCRIPTION OF DRAWINGS

FIGS. 7-15 illustrate a method of vitrifying a specimen within the specimen container of FIG. 1 using the system console of FIG. 4.

FIGS. 16-18 illustrate a method of retrieving a specimen that has been preserved in a vitrified state within the specimen container of FIG. 1.

FIG. 25 is an enlarged, cross-sectional view of a proximal end region of a specimen container that includes a barcode label.

FIG. 26 is an enlarged, cross-sectional view of a proximal end region of a specimen container that includes a quick response (QR) code label.

FIGS. 27 and 28 are side views of a specimen container that includes an identification label serving as a proximal closure, with the identification label shown in an open configuration and a closed configuration, respectively.

FIG. 29 is a perspective view of a specimen container that includes a flared proximal end region.

FIG. 30 is a perspective view of a specimen container that includes a bulbous region near a proximal end of the specimen container.

FIG. 31 is a perspective view of a specimen container that includes a bulbous region near a distal end of the specimen container.

FIG. 32 is a perspective view of a specimen container that includes a bulbous region along a central portion of the specimen container.

FIG. 35 is a perspective view of a specimen container that includes a sieve for draining media from a distal end of the specimen container.

FIG. 36 is an enlarged perspective view of a distal end region of the specimen container of FIG. 35.

FIG. 46 is a perspective view of a system console in an open configuration that can be used to process a specimen contained within a specimen container.

DETAILED DESCRIPTION

Figure 1:
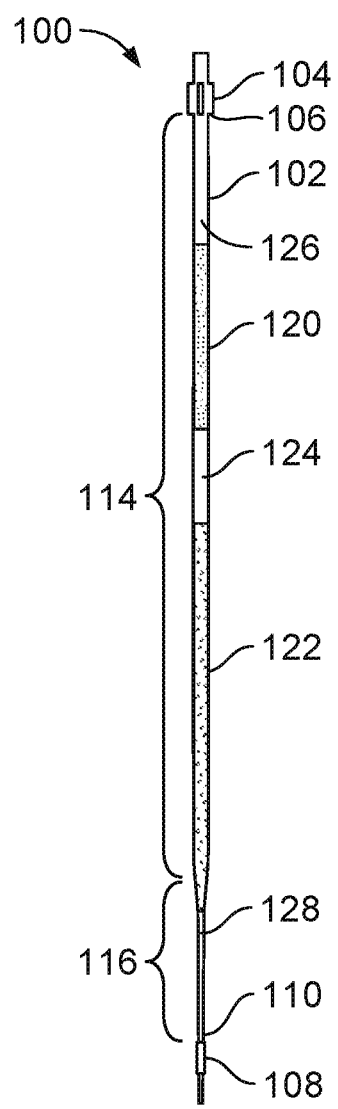
FIG. 1 is a cross-sectional view of a specimen container that is designed for cryopreparation and cryopreservation of a specimen.

FIG. 1 illustrates a specimen container 100 that can be used to prepare a specimen according to a biological or other protocol and to subsequently store the specimen in a low temperature substance. In particular, the specimen container 100 is a cryogenic device that is configured for cryopreparation and cryopreservation of a specimen in a viable and vitrified state within the low temperature substance until the specimen is desired for use (e.g., over a period of up to about 30 years). The specimen may be a single cell, a collection of free (e.g., unattached) cells, or a collection of attached cells (e.g., a multicellular tissue).

Example specimens include reproductive specimens (e.g., oocytes, zygotes, embryos, blastocysts, and gastrulae) and other, non-reproductive specimens (e.g., T-cells and blood cells). The specimen may be a mammalian sample or a non-mammalian sample. In some examples, the specimen is an agricultural specimen, such as canola. In some instances, the specimen is a non-biological specimen, such as various chemicals or other non-biological specimens. The low temperature substance (e.g., liquid nitrogen, cryogenic plasma, or liquid helium) typically has a temperature of about −80° C. to about −296° C. (e.g., about −196° C. for liquid nitrogen) and maintains the specimen in a vitrified state.

Figure 2:
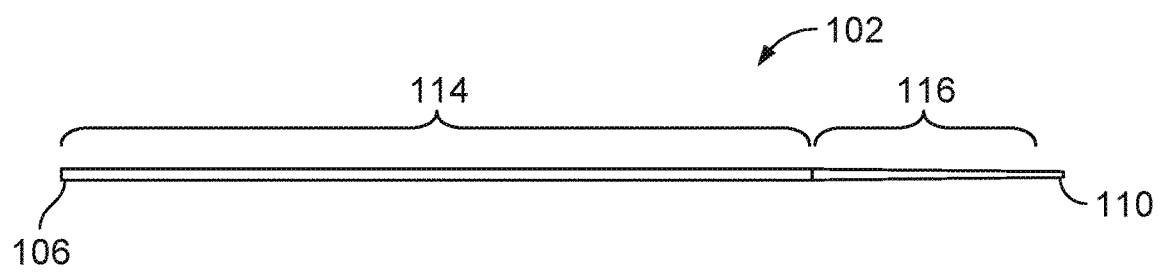
FIG. 2 is a cross-sectional view of an elongate tube of the specimen container of FIG. 1.

Referring to FIGS. 1 and 2, the specimen container 100 includes an elongate tube 102, a proximal closure 104 that hermetically seals a proximal end 106 of the elongate tube 102, and a distal closure 108 that hermetically seals a distal end 110 of the elongate tube 102. The elongate tube 102 is a thin capillary tube of very small diameter (e.g., having an internal diameter on the order of $10^{-4}$ m). The elongate tube 102 has a substantially constant diameter along a main portion 114 (e.g., a cylindrical portion) and has a variable diameter that gradually decreases along a tapered portion 116 that extends from the main portion 114 to the distal end 110.

The proximal closure 104 is a cap that is designed to surround the proximal end 106 of the elongate tube 102. The proximal closure 104 can be reversibly installed and removed from the proximal end 106 to seal the proximal end 106 and to open the proximal end 106 to allow proximal access to the elongate tube 102, respectively. The distal closure 108 is a single-use seal (e.g., a melt seal, a fold, glue or adhesive, or an occluding member) that can be removed (e.g., cut or otherwise separated) from the distal end 110 of the elongate tube 102 to allow material to pass distally out of the elongate tube 102.

The main portion 114 of the elongate tube 102 typically has a length of about 10 mm to about 200 mm (e.g., about 80 mm), an outer diameter of about 0.5 mm to about 8 mm (e.g., about 3 mm), and a wall thickness of about 0.1 mm to about 2 mm (e.g., about 0.75 mm). The tapered portion 116 of the elongate tube 102 typically has a length of about 5 mm to about 60 mm (e.g., about 15 mm), a maximum outer diameter that is adjacent and equal to the outer diameter of the main portion 114, a minimum outer diameter (e.g., at the distal end 110 of the elongate tube 102) of about 0.3 mm to about 8 mm (e.g., about 0.5 mm), and a wall thickness of about 0.1 mm to about 2 mm (e.g., about 0.2 mm). A lumen of the elongate tube 102, at a smallest inner diameter, is large enough to accommodate a specimen, which typically has a diameter or a width in a range of about 50 µm to about 150 µm. A geometry and a construction (e.g., a thin and small profile) of the elongate tube 102 are configured to increase (e.g., maximize) heat transfer and to reduce (e.g., minimize) thermal mass to provide suitable cooling and warming rates of the specimen container 100 during ART protocols. The specimen container 100 typically has a total length (e.g., including lengths of the elongate tube 102, the proximal closure 104, and the distal closure 108) of about 15 mm to about 260 mm (e.g., about 150 mm).

The elongate tube 102 may be manufactured via an injection molding process, a casting process, or an extrusion process. The elongate tube 102 is typically made of one or more materials that can withstand the low temperature substance, including but not limited to polymers such as polystyrene, polypropylene, polyvinyl acetate, and polycarbonate, and fluoropolymers. The elongate tube 102 is also typically transparent or translucent to allow viewing of the specimen through the wall of the elongate tube 102. The proximal and distal closures 104, 108 may be manufactured via radio frequency (RF) or ultrasonic sealing and are typically made of one or more materials that can withstand the low temperature substance, including but not limited to polymers such as polystyrene, polypropylene, polyvinyl acetate, and polycarbonate, and fluoropolymers.

The specimen container 100 is designed to exploit mass properties (e.g., density or fluid mechanics) of a specimen with respect to mass properties of various processing media. Accordingly, the lumen of the elongate tube 102 is internally preloaded with multiple fluids to which the specimen will be exposed during a cryopreparation process. In some implementations, for example, the elongate tube 102 is preloaded with an equilibration solution 120 (e.g., a cryoprotectant of relatively low density) and a vitrification solution 122 (e.g., a cryoprotectant of relatively high density) that are separated by a separation fluid 124 (e.g., an air bubble or an immiscible media). Such separation of the equilibration solution 120 and the vitrification solution 122 enables appropriate processing of the specimen (e.g., sequential exposure of the specimen to particular solutions for desired periods of time) during vitrification protocols. The elongate tube 102 is further preloaded with a proximal air pocket 126 that separates the equilibration solution 120 from the proximal closure 104 and a distal air pocket 128 (e.g., occupying a portion of an interior volume of the tapered portion 116 of the elongate tube 102) that separates the vitrification solution 122 from the distal closure 108.

Example equilibration solutions 120 include non-essential and essential amino acids, gentamicin sulfate (0.01 g/L), 7.5% (v/v) each of DMSO and ethylene glycol and 12 mg/mL human albumin Such equilibration solutions 120 typically have a density in a range of about 1.030 g/mL to about 1.095 g/mL. The volume of the equilibration solution 120 within the elongate tube 102 is typically about 2 µL to about 20 µL. Example vitrification solutions 122 include non-essential amino acids, gentamicin sulfate (0.01 g/L), 15% (v/v) each of DMSO and ethylene glycol, 12 mg/mL human albumin, and 0.6 M sucrose. Such vitrification solutions 122 typically have a density in a range of about 1.100 g/mL to about 1.200 g/mL, such that the vitrification solution 122 is typically more dense than the equilibration solution 120. The volume of the vitrification solution 122 within the elongate tube 102 is typically about 2 µL to about 20 µL. The volume of the separation fluid 124 is typically about 0.1 µL to about 20 µL. The separation fluid 124 typically has a density that is less than densities of the equilibration solution 120 and the vitrification solution 122. For example, the separation fluid 124 typically has a density in a range of about 1 g/mL to about $179 \times 10^{-6}$ g/mL. The equilibration solution 120 and the vitrification solution 122 are typically axially spaced about 0.5 mm to about 20 mm apart from each other within the elongate tube 102 (e.g., according to the volume of the separation fluid 124 and an inner diameter of the elongate tube 102). The specimen to be placed in the container typically has a density that is different from densities of the equilibration solution 120 and the vitrification solution 122. The specimen typically has a density that is slightly greater than about 1.000 g/mL outside of the solutions 120, 122, but that rapidly changes upon exposure to the solutions 120, 122. For example, initially, the specimen nearly floats in the equilibration solution 120, but becomes denser as cells of the specimen are hydrated by the equilibration solution 120.

Figure 3:
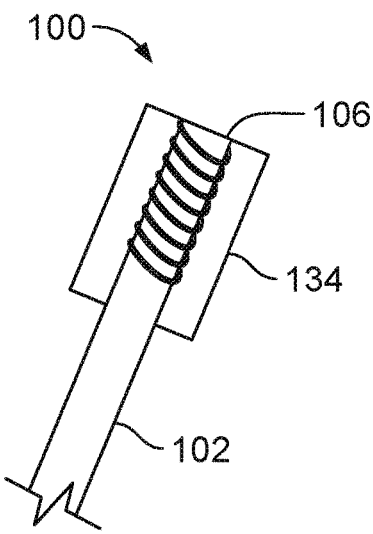
FIG. 3 is an enlarged, cross-sectional view of a proximal end region of the specimen container of FIG. 1.
Figure 4:
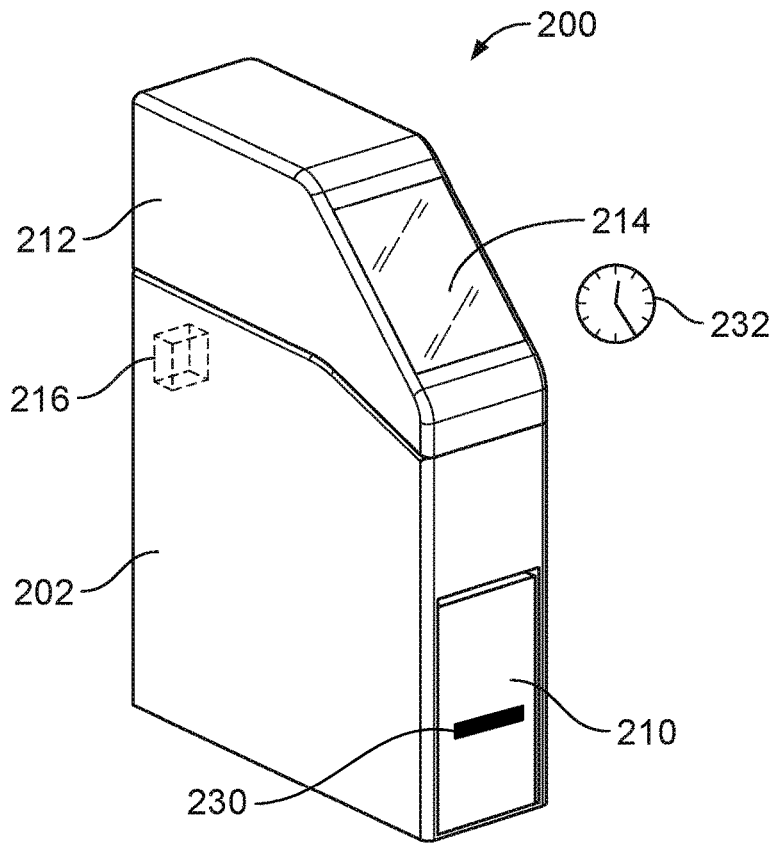
FIG. 4 is a perspective view of a system console in a closed configuration that can be used to process a specimen contained within the specimen container of FIG. 1.
Figure 6:
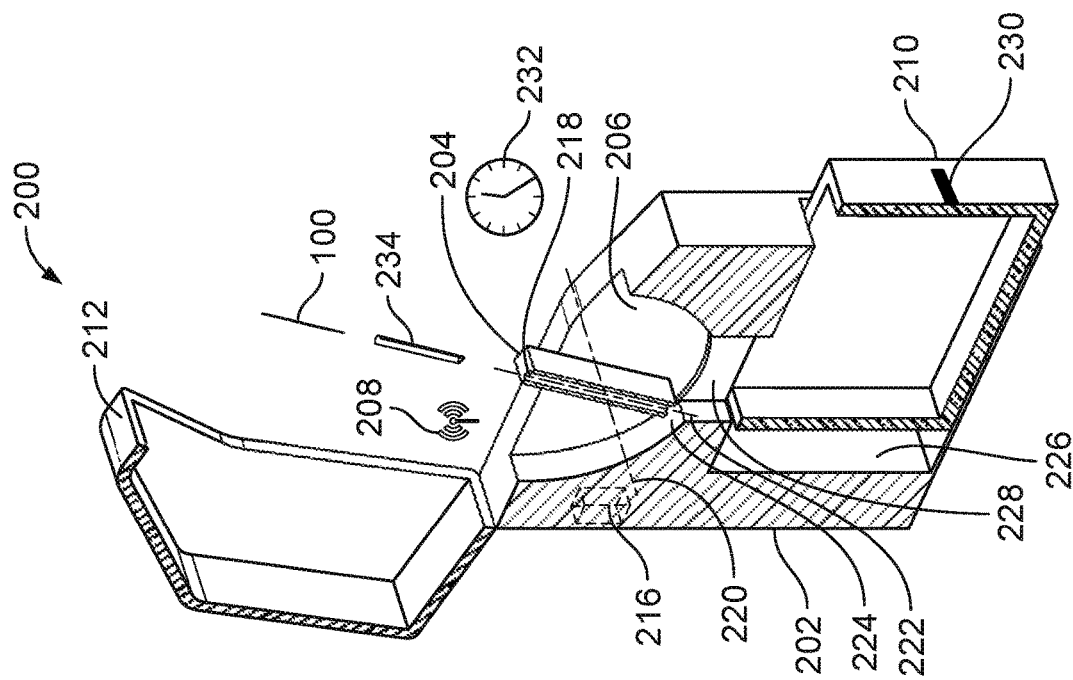
FIG. 6 is a cross-sectional perspective view of the system console of FIG. 4 in an open configuration.
Figure 5:
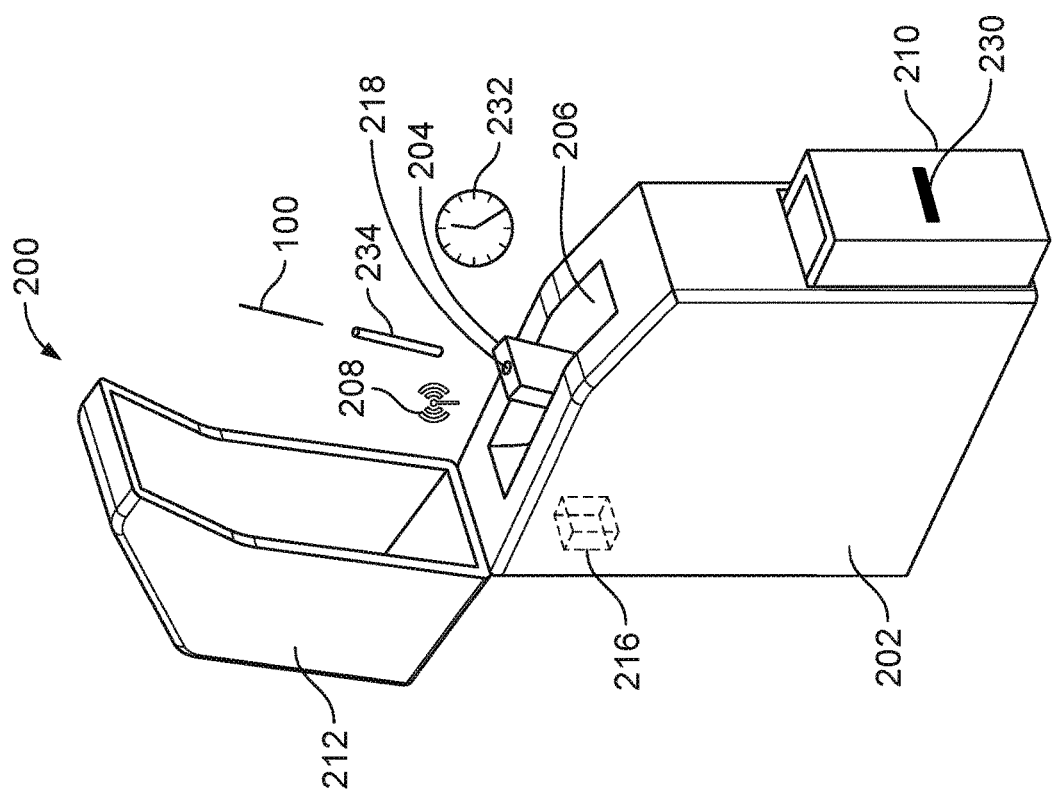
FIG. 5 is a perspective view of the system console of FIG. 4 in an open configuration.

Referring to FIG. 3, the specimen container 100 further includes an identification (ID) label 134 attached to the elongate tube 102 near the proximal end 106. The ID label 134 can be a radio-frequency identification (RFID) tag (e.g., including an internal antenna) that includes machine readable information. Additionally, human readable information may be written on an outer surface of the ID label 134. Either or both of the machine readable information and the human readable information may include various patient data, such as a name, a birthdate, and a unique reference code (e.g., an alphanumeric sequence). The ID label 134 of the specimen container 100 can be detected and read by a scanning component of a system console, as will be discussed in more detail below with respect to FIGS. 4-6.

The specimen container 100 is a sterile, single-use device that is non-toxic to specimens contained therein. The specimen container 100 is typically packaged as a single unit, and both the specimen container 100 and the packaging will remain sterile for a guaranteed shelf-life of the specimen container 100. The total length of the specimen container 100 typically allows the specimen container 100 to fit within standard storage containers and other standard equipment used in ART protocols.

In some embodiments, a system console including various ART components can be used to process a specimen contained within the specimen container 100. For example, referring to FIGS. 4-6, a system console 200 includes a base housing 202, a receptacle 204 that can spin within an interior pocket 206 of the base housing 202, a reader component 208 (e.g., an RFID antenna or another type of reader component, illustrated schematically) that is programmed to read the ID label 134 of the specimen container 100, and a cooler 210 that is slidable within a drawer 226 of the base housing 202 and that is configured to contain a low temperature substance. The system console 200 further includes a lid 212 that is openable to allow access to the receptacle 204, a user interface screen 214 positioned along a front side of the lid 212, a timer 232 (illustrated schematically), and a control module 216 (illustrated schematically) that is programmed to control various features and functionalities of the system console 200. The reader component 208, the timer 232, and the control module 216 may be positioned at respective locations within the system console 200 that are suitable for their respective functions. In some embodiments, the system console 200 further includes an accessory tube 234 that is sized to surround the specimen container 100 and to be received in the receptacle 204.

The base housing 202 is configured to support the receptacle 204 and the lid 212, to receive the cooler 210, and to rest atop a floor or another flat surface. The receptacle 204 is provided as an elongate channel that is sized to receive the specimen container 100 at an entry opening 218. The reader component 208 can detect a presence of the specimen container 100 within the receptacle 204 by reading the ID label 134 (e.g., the RFID tag) and can communicate such detection to the control module 216, which can cause the timer 232 to be activated. According to one or more signals received from the control module 216, the receptacle 204 can spin within the interior pocket 206 about a spin axis 220 of the receptacle 204. Such spinning causes the specimen to move within the specimen container 100 along a radial axis 222 of the receptacle 204 toward the distal end 110 of the elongate tube 102. According to one or more signals received from the control module 216, an adjustable exit opening 224 of the receptacle 204 can be closed or constricted to support the specimen container 100 during spinning. The exit opening 224 can also be opened or enlarged to release the specimen container 100 downward through an exit channel 228 of the base housing 202 and into the cooler 210 following spinning for vitrification and storage of the specimen container 100 within the low temperature substance contained within the cooler 214.

One or more storage containers may be disposed within the cooler 210 for receiving the specimen container 100. In some embodiments, the cooler 210 can be slid in and out of the drawer 226 of the base housing 202 in an automated manner according to one or more signals received from the control module 216 to allow a user to check a level of the low temperature substance (e.g., which can be susceptible to evaporation) and/or to refill the cooler 210 with the low temperature substance. In some embodiments, the cooler 210 is configured to be manually slid in and out of the drawer 226 via a handle 230. In some embodiments, the system console 200 includes a sensor that can detect the level of the low temperature substance within the cooler 210.

The lid 212 is manually movable (e.g., pivotable, slidable, or removable) with respect to the base housing 202 to allow access to the receptacle 204. The user interface screen 214 allows a user to input several parameters that govern operation of the system console 200 to vitrify the specimen 101, such as a stage of the specimen 101 (e.g., an oocyte or a blastocyst protocol selection). The user interface screen 214 may be an integrated touchscreen or a touchless screen associated with tactile control elements, such as buttons, knobs, dials, or the like. The control module 216 includes one or more processors that are in communication with and/or are programmed to control various actuators and sensors of the system console 200 related to various automated features, such as receiving and instantiating user selections input at the user interface screen 214, reading the ID label 134 of the specimen container 100, executing the timer 232, spinning the receptacle 204 at a specified spin speed for a specified duration, adjusting the exit opening 224 of the receptacle 204, sliding the cooler 210 along the drawer 226, detecting the level of the low temperature substance, detecting an open/closed state of the lid 212, and providing audible and/or visual feedback regarding a progression of the process.

In some embodiments, the base housing 202 and the lid 212 of the system console 200 have a length of about 0.2 m to about 1 m and a width of about 0.1 m to about 0.5 m. In some embodiments, the base housing 202 has a height of about 0.1 m to about 1.0 m, and the lid 212 has a height of about 0.05 m to about 0.25 m, such that the system console 200 has a total height (e.g., when the lid 112 is closed) of about 0.15 m to about 1.25 m. In some embodiments, the system console 200 (e.g., absent the low temperature substance) has a weight in a range of about 10 kg to about 75 kg and is typically stored on a laboratory floor, a storage facility floor, a table, or a countertop, that has an ambient environmental temperature of about 18° C. to about 28° C. In some embodiments, the receptacle 204 has a length of about 5 cm to about 90 cm. In some embodiments, the receptacle 204 is sized to hold one specimen container 100, such that the receptacle 204 has an internal diameter of about 0.5 cm to about 2 cm. In alternative embodiments, the receptacle 204 is sized to hold multiple (e.g., eight) specimen containers 100, such that the receptacle 204 has an internal diameter of about 1 cm to about 10 cm.

The receptacle 204 is typically made of metal. The base housing 202 and the lid 212 are typically made of materials that provide a degree of thermal insulation, such as polymers. In some embodiments, the cooler 210 has a length of about 0.1 m to about 0.5 m, a height of about 0.1 m to about 0.5 m, a width of about 0.1 m to about 0.5 m, and a wall thickness of about 1 cm to about 5 cm. The cooler 210 is typically made of one or more insulative materials, such as extruded polystyrene foam or vacuum and laminate container material constructions.

FIGS. 7-15 illustrate a method of vitrifying a specimen 101 within the specimen container 100 using the system console 200. Referring to FIG. 7, the proximal closure 104 is removed (e.g., pulled or twisted) from the elongate tube 102 to allow access to the lumen of the elongate tube 102. Referring to FIGS. 8 and 9, a delivery device 103 (e.g., a micropipette, a spatula, or another device) is used to deliver the specimen 101 to the lumen through the proximal end 106 of the elongate tube 102. The specimen 101, along with a small surrounding volume of culture media, may be deposited directly into the equilibration solution 120 or deposited just atop the equilibration solution 120 within the proximal air pocket 126. The proximal closure 104 is then reinstalled to the proximal end 106 to reseal the elongate tube 102.

Referring again to FIG. 5, the lid 212 of the system console 200 is opened, and the specimen container 100, with the specimen 101 contained therein, is then loaded into the receptacle 204 of the system console 200, such that, with respect to the spin axis 220, the distal end 110 is spaced further from the spin axis 220 than is the proximal end 106. Referring again to FIG. 4, the lid 212 is closed, and the reader component 208 of the system console 200 detects the presence of the specimen container 100, such that the timer 232 is activated to run for a first predetermined exposure period in response to the detection. The specimen container 100 is allowed to sit in place (e.g., stationary) in the receptacle 204 for the first predetermined exposure period so that the specimen 101 can equilibrate in the equilibration solution 120. The first exposure period may range from about 5 minutes to about 15 minutes, depending on various parameters of typical ART protocols.

During the first exposure period, the equilibration solution 120 draws water molecules out from the specimen 101 and infuses cryoprotectants into the specimen 101 according to osmotic potential. The reduction of water content and addition of cryoprotectants aids in minimizing damage to cellular components of the specimen 101 during freeze and warming cycles. Although the specimen 101 is denser than the equilibration solution 120 and will therefore very gradually descend through the equilibration solution 120 due to gravitational forces over time, the specimen 101 will typically still be suspended within the equilibration solution 120 and will not have yet reached the separation fluid 124 by the end of the first exposure period, as shown in FIG. 10.

Referring to FIGS. 11-14, once the specimen 101 has been exposed to the equilibration solution 120 for the predetermined exposure period, the receptacle 204 is activated to spin the specimen container 100 at a select low speed to advance the equilibration solution 120 and the specimen 101 axially through the separation fluid 124 to the vitrification solution 122. The specimen container 100 is typically spun for about 0.5 minutes to about 5 minutes at an angular speed of about 50 rpm to about 1200 rpm, which exerts enough centripetal force on the specimen 101 to cause the specimen 101 to descend into the vitrification solution 122 in a timely manner, but not enough to cause mechanical damage to the specimen 101. Such speed (e.g., corresponding to about 5 g to about 200 g) is significantly slower than speeds of even very low-speed conventional laboratory centrifuges, which are typically capable of revolving specimens about a centrifuge axis at speeds in a range of about 4000 rpm to about 300,000 rpm (e.g., corresponding to about 2,500 g to about 65,000 g).

Referring particularly to FIG. 11, during an initial phase of spinning, the specimen 101 descends within the equilibration solution 120 while the equilibration solution 120, containing the specimen 101, descends via bulk motion through the separation fluid 124 (e.g., thereby displacing the separation fluid 124) toward the vitrification solution 122. Referring particularly to FIG. 12, during a subsequent phase of spinning, the equilibration solution 120 reaches the vitrification solution 122, and the specimen 101 passes from the equilibration solution 120 into the vitrification solution 122. Referring particularly to FIG. 13, during a next phase of spinning, the equilibration solution 120 merges with the vitrification solution 122 to form a combined vitrification solution 130 (e.g., including the equilibration solution 120, the vitrification solution 122, and a mixed solution interface layer between the equilibration solution 120 and the vitrification solution 122), and the specimen 101 continues to descend through the combined vitrification solution 130.

Referring particularly to FIG. 14, during a final phase of spinning, the specimen 101 rests on a meniscus 132 of the distal air pocket 128 due to surface tension and thereby avoids contact with the relatively hard wall of the elongate tube 102. For example, due to a balance between surface tension at the interface of the combined vitrification solution 130 and the distal air pocket 128, and tension between combined vitrification solution 130 and an interior wall of the tapered portion 116, the potential buoyancy force of the distal air pocket 128 is not sufficient to break through meniscus 132. Therefore, the specimen 101 cannot penetrate the meniscus 132.

With the specimen 101 resting on the meniscus of the distal air pocket 128 upon completion of spinning, the timer 232 is activated, and the specimen container 100 is allowed to sit in place (e.g., stationary) in the receptacle 204 for a second predetermined exposure period for the specimen 101 to be exposed to the combined vitrification solution 130. The second exposure period may range from about 0.5 minutes to about 2 minutes, depending on various parameters of typical ART protocols. During the second exposure period, permeation of cryoprotectants within the combined vitrification solution 130 into the specimen 101 replaces water within the specimen 101, thereby dehydrating the specimen and further infusing the specimen 101 with cryoprotectants. Such a stage-like progression of media concentrations avoids an excessively high initial osmotic differential that could otherwise cause cells of the specimen 101 to shrink too much and too rapidly as the water leaves the cells at a rate faster than the cryoprotectants can enter the cells.

Owing to a preloaded state of the equilibration solution 120 and the vitrification solution 122 within the specimen container 100, a specimen can be prepared for vitrification within a single, isolated environment (e.g., the lumen of the specimen container 100) without being exposed to contamination, mechanical damage (e.g., from a micropipette or other specimen holding or fluid delivery device), or other accidental mishandling that may otherwise occur when a container that houses a specimen is accessed multiple times to deliver and remove various processing mediums or when a specimen is moved to various containers (e.g., petri dishes, test tubes, or flask) during an ART process.

In some implementations, once the second exposure period has ended, the specimen container 100, containing the specimen 101, is released directly from the receptacle 204 downward through the exit channel 228 of the base housing 202 (refer to FIG. 6) and into the low temperature substance (e.g., liquid $N_2$ at a temperature of about −196° C.) contained within the cooler 210 for temporary low temperature storage. The specimen container 100 is deposited in a manner such that at least a distal portion of the specimen container 100 surrounding the specimen 101 is submerged in the low temperature substance. The timer 232 is activated, causing the specimen 101 to rapidly cool to a glass state before ice crystals can form within cells of the specimen 101 so that specimen 101 can be preserved in a viable state. The specimen container 100, containing the specimen 101, is then manually transferred from the cooler 210 of the system console 200 to a long-term low temperature storage structure, where the specimen 101 can be maintained in a cryogenic state for a period of up to about 20 years. In some instances, the specimen container 100 may be stored in the long-term low temperature storage structure for a much shorter period (e.g., as short as few hours).

In some alternative implementations, once the second exposure period has ended, the specimen container 100, containing the specimen 101, is manually removed from the receptacle 204, visually inspected, and then subsequently reinserted into the receptacle 204 for release into the cooler 210, as opposed to being immediately released downward into the cooler 210 upon termination of the second exposure period. Referring to FIG. 15, in some implementations, once the second exposure period has ended, the specimen container 100, containing the specimen 101, is manually removed from the receptacle 204 and immersed in a low temperature substance 105 within a beaker 107 or other container instead of being released into the cooler 210. As discussed above, the specimen container 100 is immersed in a manner such that at least a distal portion of the specimen container 100 surrounding the specimen 101 is submerged in the low temperature substance 105. The timer 232 (or another timer) can be activated to track the relatively short duration in which the specimen container 100 is submerged. The specimen container 100, containing the specimen 101, is then manually transferred from the beaker 107 to a long-term low temperature storage structure.

Figure 18:
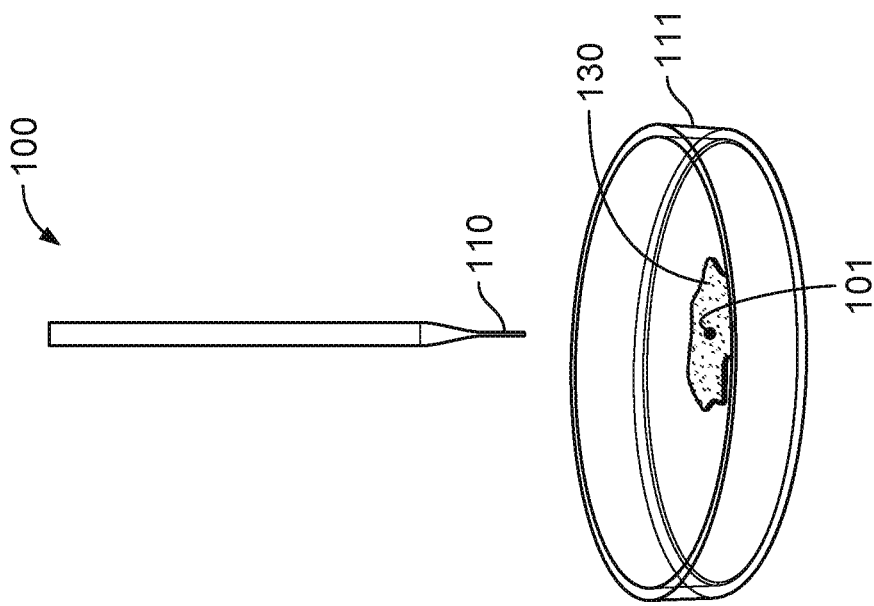
Figures 17A, 17B:
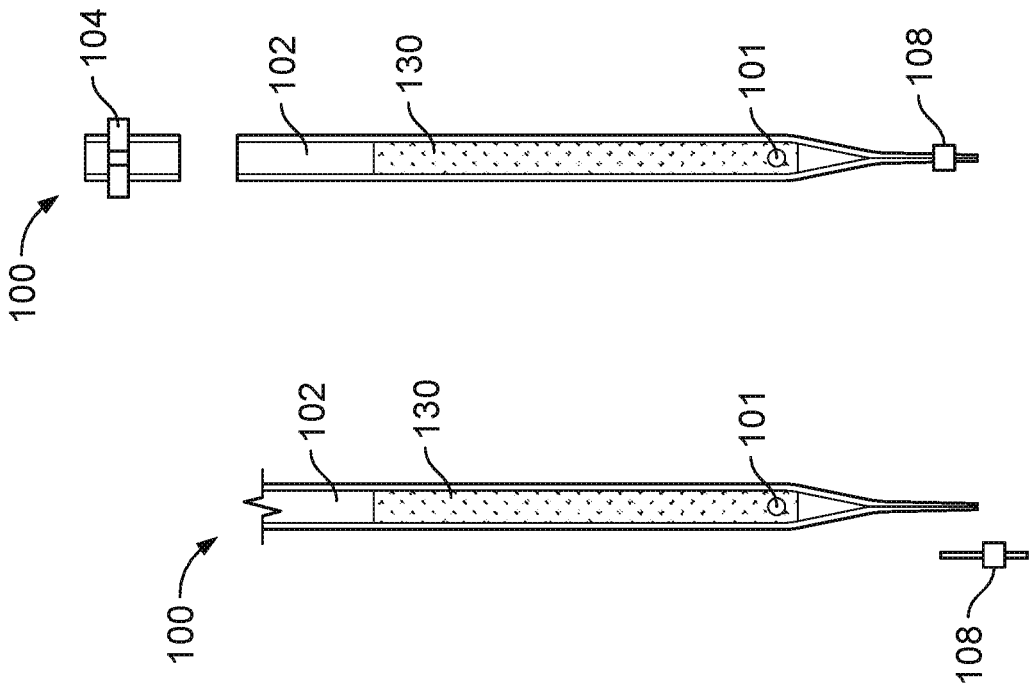

Referring to FIGS. 16-18, the specimen container 100 can be stored in the long-term low temperature storage structure until the specimen 101 is ready to be used in reproductive or other procedures. At such a time, the specimen container 100 can be removed from the storage structure and subsequently thawed via standard warming protocols in which the specimen 101 is exposed to one or more warming solutions. For example, referring to FIG. 16, the specimen container 100, containing the specimen 101, is transferred to a one or more warming solutions 109 at a temperature of typically about 37° C. for a period of about 3 seconds to about 1 minute. In some implementations, the warming solutions 109 may be at about room temperature. Referring to FIGS. 17A and 17B, the specimen container 100 is opened by one or both of removing the distal closure 108 (e.g., cutting off the distal closure 108 along the distal air pocket 128) from the elongate tube 102 (FIG. 17A) and removing (e.g., pulling, twisting, or cutting) the proximal closure 104 from the elongate tube (FIG. 17B). Referring to FIG. 18, the specimen 101 and the combined vitrification solution 130 can then be dispelled (e.g., drained or purged) from the opened specimen container 100 into a petri dish 111 or other container at a temperature of about 37° C. for further processing of the specimen 101 according to selected ART protocols.

While certain embodiments of specimen containers have been described above, other embodiments are possible.

While certain implementations of vitrifying a specimen have been described above, other implementations are possible. For example, while the process for vitrifying the specimen 101 has been described as including the step of immersing the specimen container 100 within a low temperature substance following spinning within the console 200, in some implementations, the specimen 101 is released onto a conventional specimen carrier for immediate use in an ART procedure without exposing the specimen container 100 to the low temperature substance for cryopreservation. In such cases, the specimen container 100 is discarded following release of the specimen 101.

While the process for vitrifying the specimen 101 has been described as including the step of spinning the specimen container 100 within the console 200 to gradually sediment the specimen 101 through the equilibration solution 120 and the vitrification solution 122, in some implementations, the specimen 101 can be grasped manually with an appropriate tool (e.g., a micropipette), manually immersed in the equilibration solution 120 for a defined period of time with the tool, advanced with the tool into the vitrification solution 122, and held in the vitrification solution 122 with the tool for a defined period of time. The specimen 101 is then released from the tool into the vitrification solution 122 for exposure of the specimen container 100, with the specimen 101 contained therein, to a low temperature substance, or the specimen 101 is manually withdrawn from the elongate tube 102 with the tool and submerged directly into liquid nitrogen or another cooling substance with the tool.

While the process for vitrifying the specimen 101 has been described as including the step of spinning the specimen container 100 within the receptacle 204 of the console 200 about the spin axis 220, in some implementations, the specimen container 100, with the specimen 101 contained therein, may be revolved within a conventional centrifuge that is designed to revolve specimen containers at appropriately low speeds about the centrifuge axis.

While the process for vitrifying the specimen 101 has been described as vitrifying a single specimen 101 at a time within the specimen container 100, in some implementations, multiple specimens may be deposited into a single specimen container 100 for simultaneous processing according to the process described above with respect to FIGS. 7-15. In some embodiments, multiple specimen containers 100, each carrying one or more specimens 101 may be placed within the receptacle 204 together for simultaneous spinning.

Figure 19:
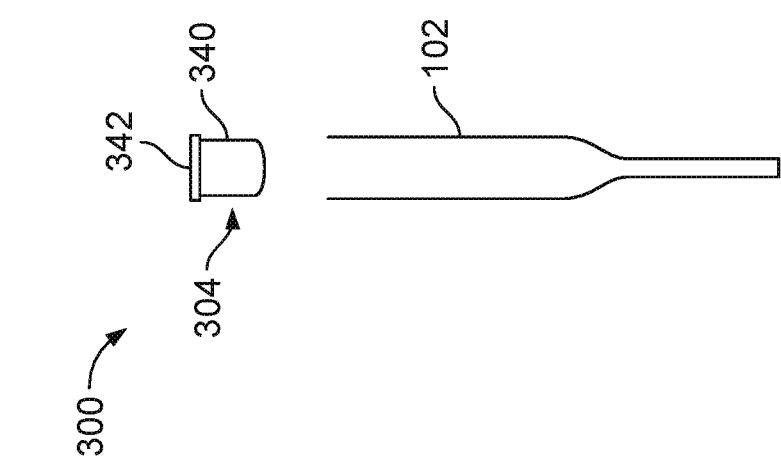
FIG. 19 is a cross-sectional view of a specimen container including a proximal closure formed as a plug.

While the specimen container 100 has been described as including the proximal closure 104 formed as a cap that surrounds an exterior wall of the elongate tube 102, in some embodiments, a specimen container 300 includes a proximal closure 304 formed as a plug (e.g., a cork) that seats within the lumen of the elongate tube 102, as shown in FIG. 19. While some features have been omitted from the drawing for clarity, the specimen container 300 is substantially similar in construction and function to the specimen container 100, except that the specimen container 300 includes the proximal closure 304 instead of the proximal closure 104. The proximal closure 304 includes a plug 340 (e.g., an inserting portion) that is sized to be snuggly inserted into the lumen of the elongate tube 102 to seal the elongate tube 102 at the proximal end 106. The proximal closure 304 further includes a top flange 342 that is wider than the elongate tube 102 such that the top flange 342 remains external to the lumen while the plug 340 is disposed within the lumen to facilitate handling the proximal closure 304. The proximal closure 304 is typically made of plastic.

Figure 20:
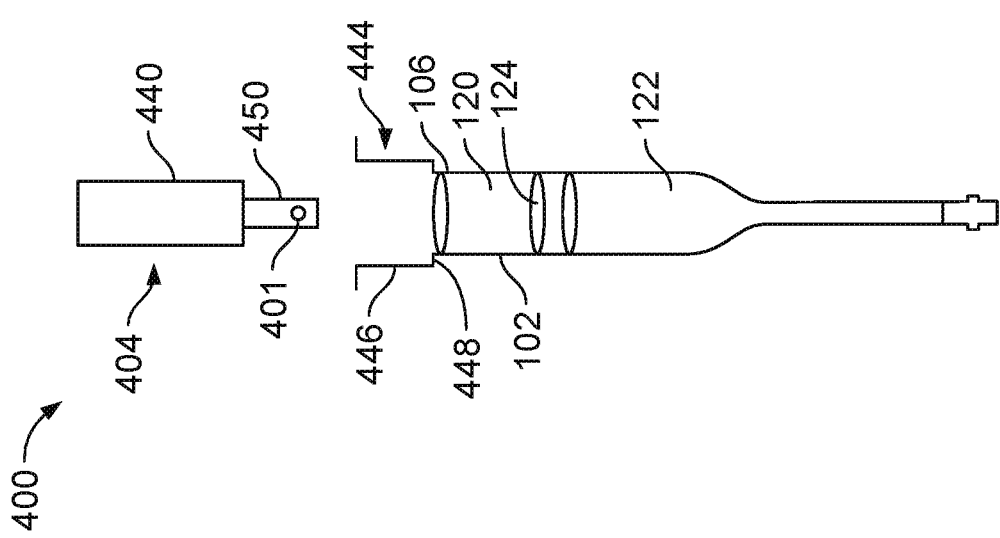
FIG. 20 is a cross-sectional view of a specimen container including a proximal closure that includes a specimen-carrying portion.

In some embodiments, a specimen container includes a proximal closure that has a specimen carrying portion. FIG. 20 illustrates a specimen container 400 that includes such a feature. The specimen container 400 is substantially similar in construction and function to the specimen container 100, except that the specimen container 400 includes a closure support 444 and a proximal closure 404 instead of the proximal closure 104. The closure support 444 is formed as a circumferential leaf structure that is wider than the elongate tube 102 and that lies adjacent the proximal end 106 of the elongate tube 102. The proximal closure 404 includes a plug 440 that is sized to be snuggly inserted into a tubular portion 446 of the closure support 444 and to rest against an annular platform 448 of the closure support 444 to seal the elongate tube 102 at the closure support 444. The plug 440 is sized to extend past an end of the closure support 444 when resting on the annular platform 448 such that the plug 440 can be used to manipulate the proximal closure 404. The proximal closure 404 further includes a specimen carrier 450 that is sized to hold a specimen 401 and to deliver the specimen 401 to the lumen of the elongate tube 102. The delivery, or transfer, of specimen 401 into equilibration solution 120 take may place by simple immersion, or g-forces could be applied to the specimen 401 to urge the specimen 401 off of the specimen carrier 450 into the equilibration solution 120. The proximal closure 404 is typically made of plastic.

In some embodiments, a specimen container that is similar to any of the specimen containers 100, 300, 400 described above or any of the specimen containers described below includes a distal closure that is formed as a plug.

Figure 21:
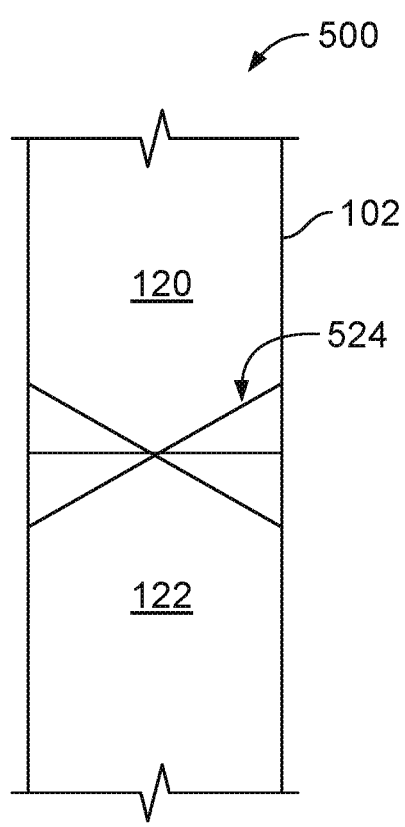
FIG. 21 is a cross-sectional view of a specimen container including a mechanical separation member.

While the specimen container 100 has been described as including a separation 124 fluid (e.g., an air bubble) that separates the equilibration solution 120 from the vitrification solution 122, in some embodiments, a specimen container includes a different separation mechanism. For example, FIG. 21 illustrates a portion of a specimen container 500 that includes a mechanical separation member 524 that serves as a barrier between the equilibration solution 120 and the vitrification solution 122. The specimen container 500 is substantially similar in construction and function to the specimen container 100, except that the specimen container 500 includes the mechanical separation member 524 instead of the separation fluid 124. In the example embodiment 500, the mechanical separation member 524 is provided as a barrier (e.g., a butterfly valve) that prevents passage of water vapor between, as well as prevents premature mixing of, the equilibration solution 120 and the vitrification solution 122 The mechanical separation member 524 is designed to remain closed under nominal conditions and to open under sufficient g-force loading, as will occur during spinning of the specimen container 500 within the system console 200 or within an appropriately designed centrifuge.

Other examples of mechanical separation members that may be included in similar specimen containers include a sphere that fits snugly within a local internal constriction, a separation fluid with properties that promote desired migration of the separation fluid while under centripetal loading (e.g., a separation fluid with a density that is less than that of the equilibration solution 120), a viscoelastic fluid that moves only when subject to sufficiently high g-force, and a film that can be pierced (or otherwise penetrated) to create a pathway large enough for the specimen 101 to easily pass through the film.

Figure 22:
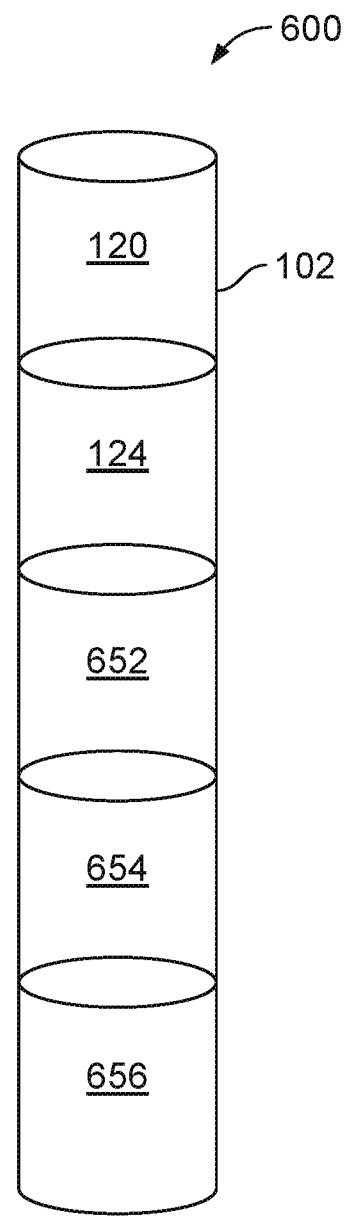
FIG. 22 is a cross-sectional view of a specimen container including multiple specimen processing mediums.

While the specimen container 100 has been described as including one equilibration solution 120 and one vitrification solution 122, in some embodiments, a specimen container includes more than one equilibration solution and/or more than one vitrification solution 122. For example, FIG. 22 illustrates a portion of a specimen container 600 that includes multiple vitrification solutions. The specimen container 600 is substantially similar in construction and function to the specimen container 100, except that the specimen container 600 includes the multiple vitrification solutions 652, 654, 656 of different densities, which may be useful in situations where it is advantageous to process a specimen 601 in smaller graduations of concentration. In some embodiments, the specimen container 600 is preloaded and packaged with one initial vitrification solution 622, which then separates into the three vitrification solutions 652, 654, 656 upon the specimen container 600 being removed from packaging and subjected to high g-forces (e.g., about 10,000 g) for a short period of time (e.g., about 10 seconds). In this manner, a concentration gradient of the vitrification solutions 652, 654, 656 can be created just prior to insertion of a specimen into the specimen container 600.

Figure 23:
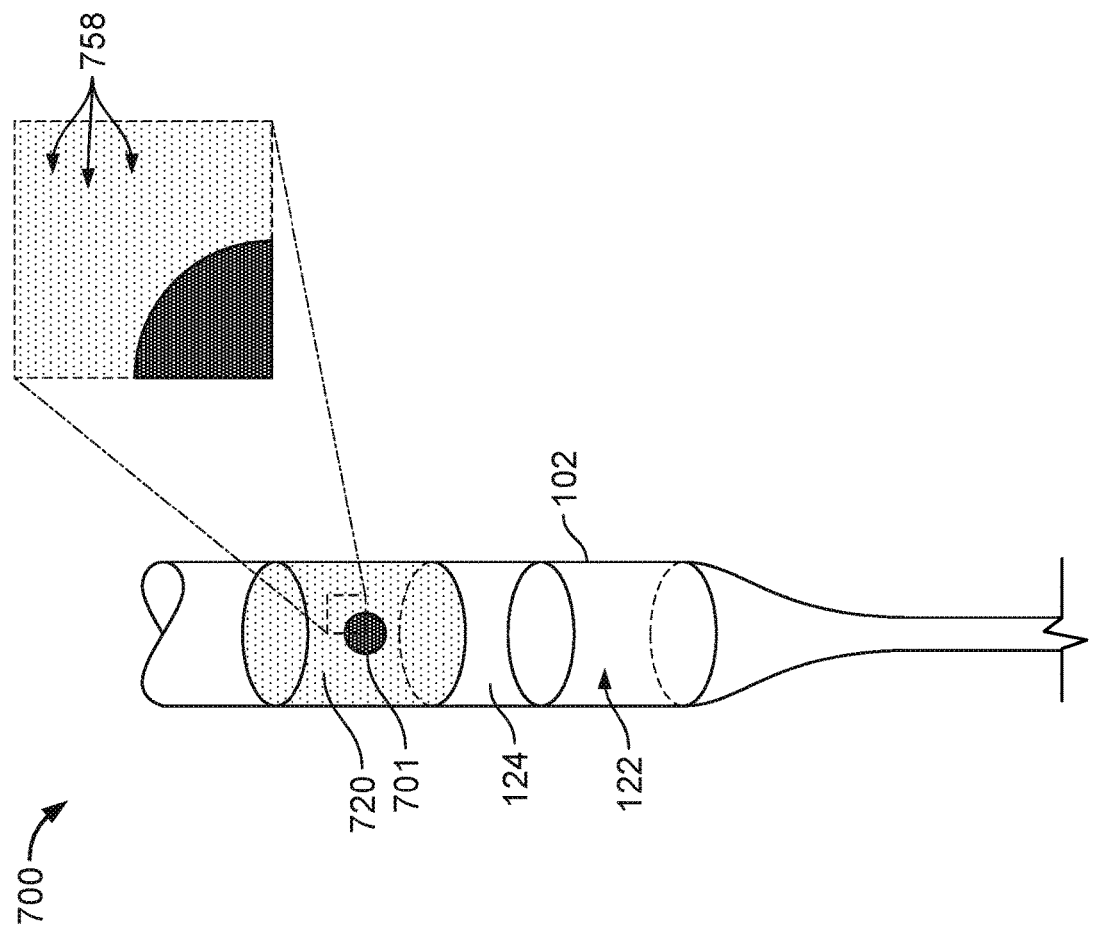
FIG. 23 is a side view of a specimen container including a first specimen processing medium with magnetic particles and separated from a second specimen processing medium.
Figure 24:
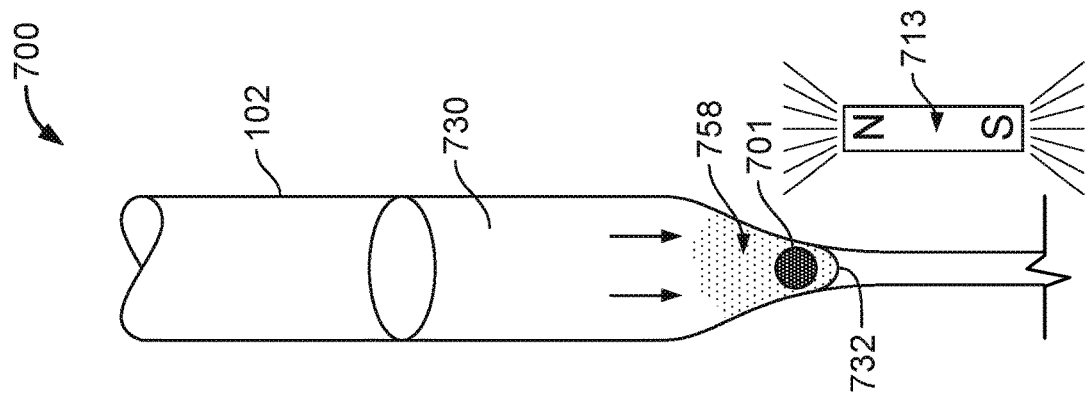
FIG. 24 is a side view of the specimen container of FIG. 23 with the first and second specimen processing mediums combined under the influence of a magnetic field.

In some embodiments, a specimen container includes one or both of an equilibration solution and a vitrification solution with magnetic properties. For example, FIGS. 23 and 24 illustrate a portion of a specimen container 700 with such a feature. The specimen container 700 is substantially similar in construction and function to the specimen container 100, except that the specimen container 700 includes an equilibration solution 720 that is loaded with magnetic nanoparticles 758 formed of iron oxide ($Fe_3O_4$). The magnetic nanoparticles 758 are coated with a biocompatible, inert substance, such as biotin or polyethylene glycol (PEG).

Referring particularly to FIG. 23, during a vitrification process, a specimen 701 can be delivered to the equilibration solution 720 as described above with respect to FIGS. 8 and 9. Referring to FIG. 24, an external magnetic field source 713 can then be turned on to provide a constant (e.g., non-alternating) magnetic field that pulls the magnetic nanoparticles 758 and the surrounding equilibration solution 720 downward into the vitrification solution 122 to form a combined vitrification solution 730. In some embodiments, the magnetic field source 713 is provided as a case that is designed to contain the specimen container 700. Accordingly, the magnetic field source 713 may be designed in a manner so as to act on the specimen container 700 while shielding other surrounding objects from the magnetic field. Downward movement of the magnetic nanoparticles 758 and the surrounding equilibration solution 720 in turn drags the specimen 701 downward toward a meniscus 732 of the combined vitrification solution 730. Owing to the sedimentation of the specimen 701 by a magnetic field, the specimen container 700 may not need to undergo a spinning process, as discussed above with respect to the system console 200.

While the specimen container 100 has been described as including an ID label 134 in the form of an RFID tag, in some embodiments, a specimen container includes an ID label in the form of a barcode or a quick response (QR) code. For example, FIGS. 25 and 26 respectively illustrate portions of specimen containers 800, 900 that include ID labels 834, 934 in the form of a barcode and a QR code at the proximal end 106 of the elongate tube 102. The specimen containers 800, 900 are otherwise substantially similar in construction and function to the specimen container 100.

In some embodiments, as shown in FIGS. 27 and 28, an ID label may, itself, serve as a proximal closure (e.g., having a sterile internal surface) and may therefore be provided as a part of a specimen container in lieu of a cap-like or plug-like proximal closure. For example, the specimen container 1000 includes an ID label 1034 in the form of an RFID tag and that is coated with an adhesive. FIG. 27 illustrates the ID label 1034 in an open configuration, while FIG. 28 illustrates the ID label 1034 in a wrapped, closed configuration. The ID label 1034 includes a printable region 1060 on which a user can write on an outer surface. The specimen container 1000 is substantially similar in construction and function to the specimen container 100, except that the specimen container 1000 includes the ID label 1034 in a configuration that serves as a proximal closure of the elongate tube 102.

In some embodiments, as shown in FIG. 29, a specimen container 1100 includes an elongate tube 1102 with a flared proximal end 1106. The specimen container 1100 is substantially similar in construction and function to the specimen container 100 except that the specimen container 1100 includes the elongate tube 1102 with the flared proximal end 1106 instead of the elongate tube 102 with the tubular proximal end 106. Though omitted for clarity, the specimen container 1100 further includes the equilibration solution 120, the separation fluid 124, the vitrification solution 122, the proximal air pocket 126, and the distal air pocket 128. The flared proximal 1106 end is formed as a receptacle that is wider than the elongate tube 1102, thereby facilitating loading of a specimen within a lumen of the elongate tube 1102 using a delivery device 103. In some embodiments, a similar specimen container includes an elongate tube with a flared proximal end of a shape different from that shown in FIG. 29.

In some embodiments, a specimen container includes a bulbous region that acts as a bulb syringe to aid in dispelling a specimen from the specimen container without opening both ends of the specimen container. For example, FIGS. 30-32 respectively illustrate specimen containers 1200, 1300, 1400 that include bulbous regions 1262, 1362, 1462 located at proximal, distal, and central regions of the specimen containers 1200, 1300, 1400. The specimen containers 1200, 1300, 1400 are substantially similar in construction and function to the specimen container 100, except that the specimen containers 1200, 1300, 1400 include the bulbous regions 1262, 1362, 1462 along elongate tubes 1202, 1302, 1402. In some embodiments, a vision system may be used to view a state and position of a specimen as the specimen is dispelled from a specimen container 1200, 1300, 1400. For example, a re-expansion state of the specimen after residing in equilibration solution 120 would indicate a state of osmotic equilibration, which could indicate to the system that the specimen is ready to advance to the vitrification solution 122).

Figure 33:
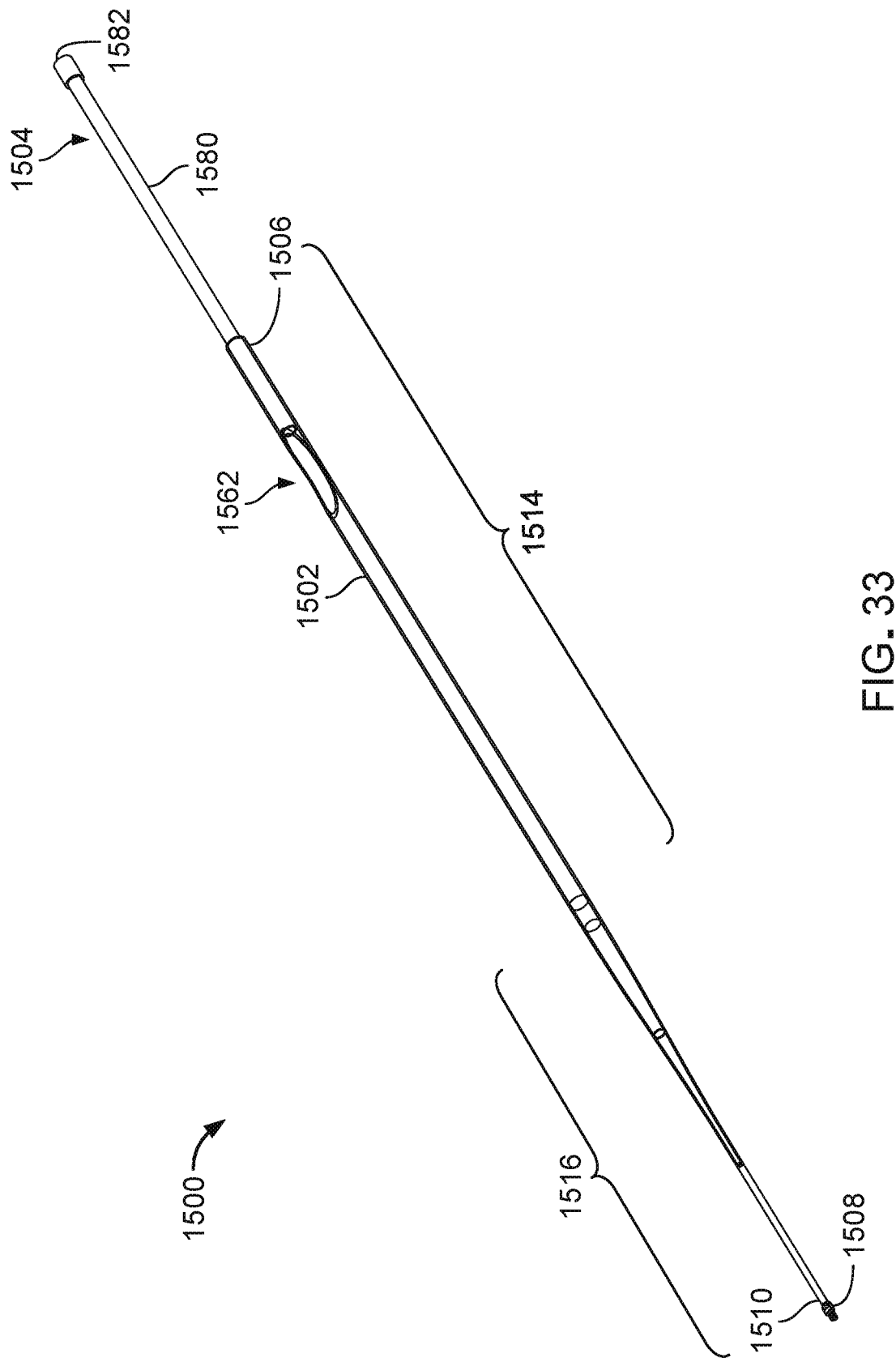
FIG. 33 is a perspective view of a specimen container that includes an access port near a proximal end of the specimen container.

In some embodiments, a specimen container includes an access port for depositing a specimen into a lumen of the specimen container. For example, FIG. 33 illustrates a specimen container 1500 including an elongate tube 1502 that defines an access port 1562. The specimen container 1500 further includes a proximal closure 1504 that hermetically seals a proximal end region of the elongate tube 1502 and a distal closure 1508 that hermetically seals a distal end 1510 of the elongate tube 1502. The elongate tube 1502 is a thin capillary tube of very small diameter (e.g., having an internal diameter on the order of $10^{-4}$ m). The elongate tube 1502 has a substantially constant diameter along a main portion 1514 (e.g., a cylindrical portion) and has a variable diameter that gradually decreases along a tapered portion 1516 that extends from the main portion 1514 to the distal end 1510.

The proximal closure 1504 is a plunger that is designed to seat within a lumen of the elongate tube 1502 to close a proximal end 1506 and the access port 1562 of the elongate tube 1502. Accordingly, the proximal closure 1504 includes a plug 1580 (e.g., an elongate cylindrical member) that is sized to be inserted into the lumen of the elongate tube 1502 and a grasping member 1582 that abuts the proximal end 1506 of the elongate tube 1502 (e.g., thereby remaining external to the lumen) when the plug 1580 is appropriately disposed within the lumen. The grasping member 1582 may have a smooth (e.g., cylindrical) outer surface or a faceted (e.g., hexagonal) outer surface that facilitates handling of the proximal closure 1504 and that limits movement of the proximal closure 1504 in instances when the proximal closure 1504 is separated from the elongate tube 1502 and placed atop a surface. In some embodiments, the exterior surface of the grasping member 1582 may have an asymmetric profile to prevent such undesired movement atop a surface. The proximal closure 1504 can be reversibly installed and removed from the proximal end region of the elongate tube 1502 to seal the proximal end 1506 and the access port 1562 and to open the proximal end region to allow proximal access to the elongate tube 1502 via the access port 1562, respectively. The distal closure 1508 is a single-use seal (e.g., a melt seal, a fold, glue or adhesive, or another occluding member) that can be removed (e.g., cut or otherwise separated) from the distal end 1510 of the elongate tube 1502 to allow material to pass distally out of the elongate tube 1502.

The main portion 1514 of the elongate tube 1502 typically has a length of about 20 mm to about 100 mm (e.g., about 50 mm), an outer diameter of about 0.5 mm to about 5 mm (e.g., about 1.8 mm), and a wall thickness of about 0.1 mm to about 2 mm (e.g., about 0.2 mm). The tapered portion 1516 of the elongate tube 1502 typically has a length of about 5 mm to about 60 mm (e.g., about 15 mm), a maximum outer diameter that is adjacent and equal to the outer diameter of the main portion 1514, a minimum outer diameter (e.g., at the distal end 1510 of the elongate tube 1502) of about 0.2 mm to about 2 mm (e.g., about 0.3 mm), and a wall thickness of about 0.05 mm to about 0.5 mm (e.g., about 0.1 mm). The proximal closure 1504 has a length of about 10 mm to about 50 mm (e.g., about 25 mm).

The access port 1562 has an elliptical cross-sectional shape and has a width that is about equal to the diameter of the main portion 1514. The access port 1562 typically has a length of about 1 mm to about 10 mm (e.g., about 2.5 mm). A center of the access port 1562 is typically located about 5 mm to about 50 mm (e.g., about 10 mm) from the proximal end 1506 of the elongate tube 1502. A lumen of the elongate tube 1502, at a smallest inner diameter, is large enough to accommodate a specimen. A geometry and a construction (e.g., a thin and small profile) of the elongate tube 1502 are configured to maximize heat transfer and to minimize thermal mass to maximize cooling and warming rates of the specimen container 1500 during ART protocols. The specimen container 1500 typically has a total length (e.g., including lengths of the elongate tube 1502, the proximal closure 1504 as installed, and the distal closure 1508) of about 100 mm to about 200 mm (e.g., about 150 mm).

The proximal closure 1504 may be made of one or materials, including plastic and stainless steel. The elongate tube 1502 may be manufactured according to the processes discussed above with respect to the elongate tube 102 and formed from the same materials as those of the elongate tube 102, as discussed above. As further discussed with respect to the specimen container 100, the lumen of the elongate tube 1502 is internally preloaded with multiple fluids (omitted from FIG. 15 for clarity) located distal to the access port 1562, sequentially including the equilibration solution 120, the vitrification solution 122, the separation fluid 124, and the distal air pocket 128 in volumetric amounts discussed above. The specimen container 1500 further includes the ID label 134 (omitted for clarity) attached to the elongate tube 1502 near the proximal end 1506.

Similar to the specimen container 100, the specimen container 1500 is a sterile, single-use device that is non-toxic to specimens contained therein. The specimen container 1500 may be packaged as a single unit, and both the specimen container 1500 and the packaging will remain sterile for a guaranteed shelf-life of the specimen container 1500. The total length of the specimen container 1500 typically allows the specimen container 1500 to fit within standard storage containers and other standard equipment used in ART protocols.

During a process of vitrifying a specimen 101 within the specimen container 1500, the proximal closure 1504 is removed (e.g., pulled or twisted) from the elongate tube 1502 to open the access port 1562. A delivery device (e.g., such as the delivery device 103) is used to deliver the specimen 101, suspended within a small amount of culture media, to the lumen of the elongate tube 1502 through the access port 1562. The specimen 101 and the culture media may be deposited directly into the equilibration solution 120 or deposited just proximal to the equilibration solution 120. The proximal closure 1504 is then reinstalled to the elongate tube 102 to reseal the proximal end 1506 and the access port 1562 for further processing of the specimen 101.

Figure 34:
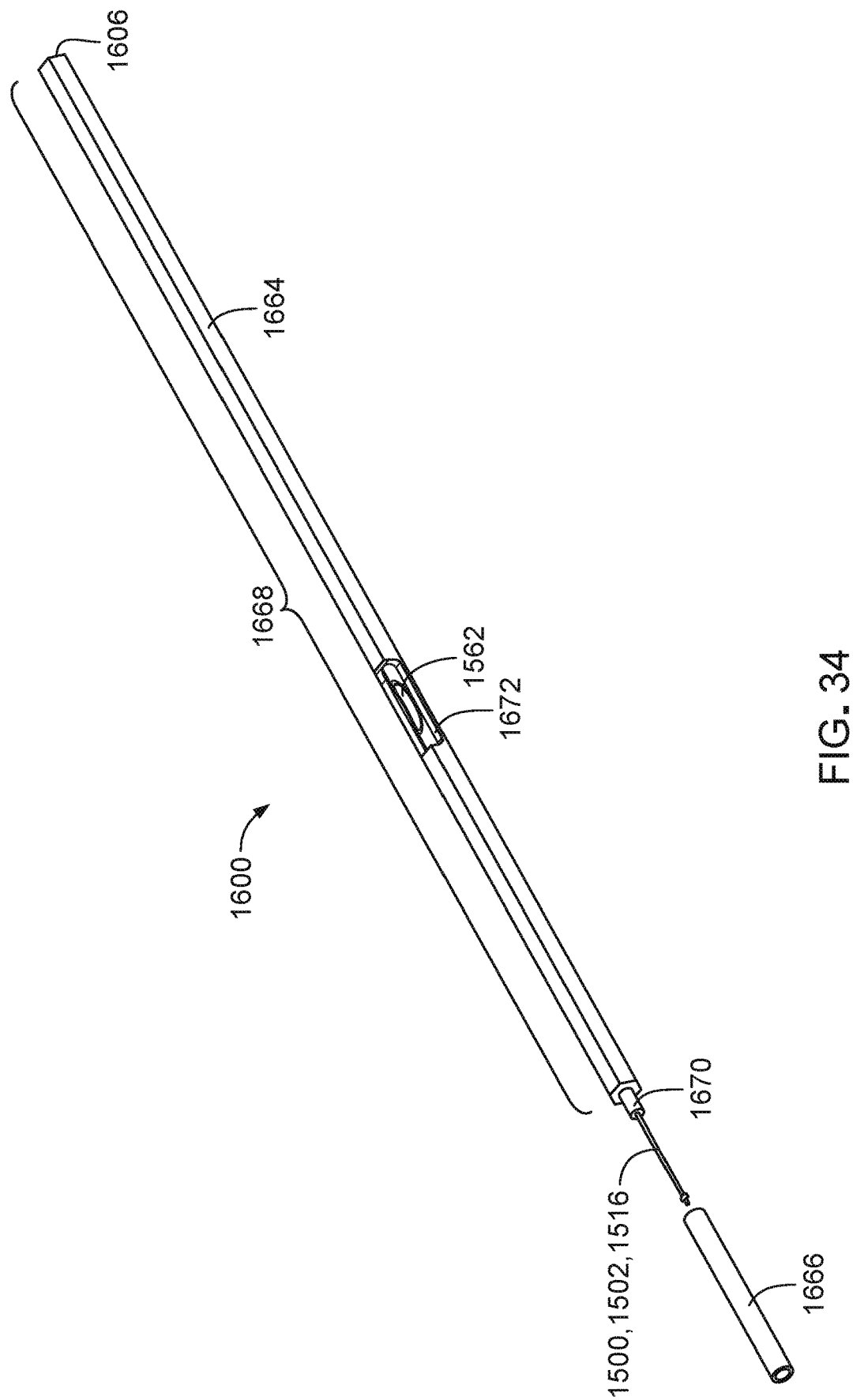
FIG. 34 is a perspective view of a handle that can be used to house, store, and manipulate the specimen container of FIG. 33.
Figure 37:
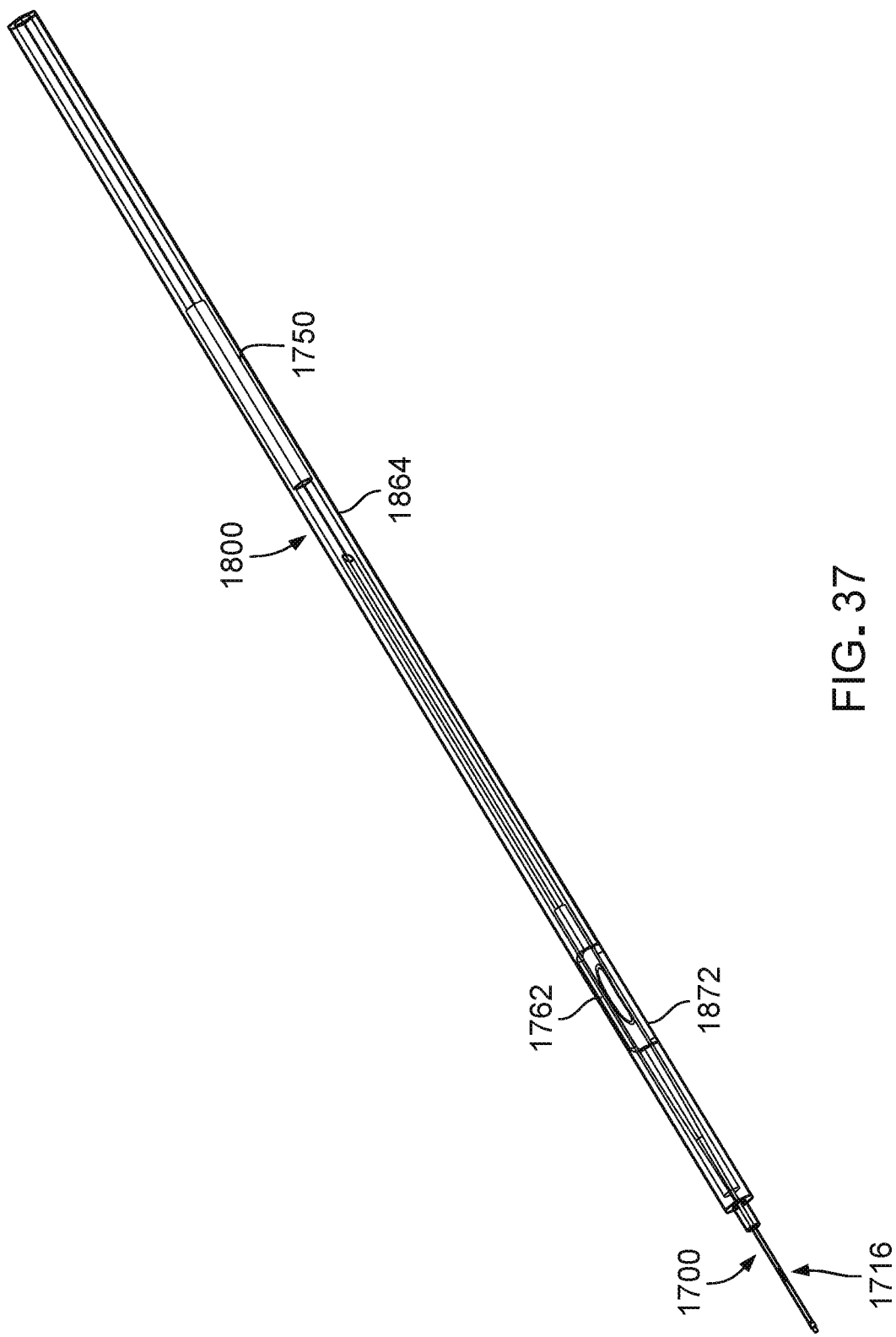
FIG. 37 is a perspective view of a handle that can be used to house, store, and manipulate the specimen container of FIG. 35.

In some embodiments, a handle can be used to house, store, and manipulate the specimen container 1500. For example, FIG. 34 illustrates such a handle 1600. The handle 1600 includes a handle body 1664 and a cap 1666 that is formed to close the handle body 1664. The handle body 1664 is open at a proximal end 1606 and is sized to carry the specimen container 1500. The handle body 1664 includes a main portion 1668 that surrounds the main portion 1514 of the elongate tube 1502 and a distal support 1670 that supports the tapered portion 1516 of the elongate tube 1502.

The main portion 1668 has a faceted (e.g., hexagonal) exterior surface and cross-sectional shape that facilitates handling of the handle body 1664 and that prevents rolling or other undesired movement of handle 1600 atop a surface. In some embodiments, the exterior surface of the main portion 1668 may have an asymmetric profile to prevent such undesired movement atop a surface. The main portion 1668 defines a window 1672 that aligns with the access port 1562 when the elongate tube 1502 is securely disposed within the handle 1600. The window 1672 is an opening defined by a cutout in the main portion 1668 of the handle body 1664. The plug 1580 is slidably guided within the handle body 1664 and may be biased to move, thereby occluding the access port 1562, by g-forces induced as would occur during spinning of the specimen container 1500, integrated inside of handle 1600, within the system console 200 or within an appropriately designed centrifuge The distal support 1670 is formed as a cylindrical tube that extends from the main portion 1668 to support the tapered portion 1516 of the elongate tube 1502 that passes therethrough. The cap 1666 is formed as a tubular member that can seat against the main portion 1668 and the distal support 1670 via a friction fit to distally close the handle body 1664. The cap 1666 can be removed from the handle body 1664 to allow access to the proximal end 1510 of the specimen container 1500.

The main portion 1668 of the handle body 1664 typically has a length of about 30 mm to about 200 mm (e.g., about 150 mm), a width of about 1.5 mm to about 3 mm (e.g., about 2.2 mm), and a wall thickness of about 0.5 mm to about 2 mm (e.g., about 0.8 mm). The window 1672 typically has a length of about 3 mm to about 20 mm (e.g., about 5 mm). A center of the window 1672 is typically located about 10 mm to about 80 mm (e.g., about 40 mm) from the proximal end 1606 of the handle body 1664. Although the main portion 1668 has a hexagonal exterior cross-sectional shape, the main portion 1668 has a cylindrical interior cross-sectional shape for smooth housing of the specimen container 1500. The distal guide 1670 of the handle body 1667 typically has a length of about 2 mm to about 10 mm (e.g., about 3.5 mm), and an outer diameter of about 1 mm to about 2.5 mm (e.g., about 1.8 mm). The tapered portion 1516 of the specimen container 1500 typically extends about 5 mm to about 20 mm past the distal guide 1670 when the specimen container 1500 is secured within the handle 1600. The cap 1666 of the handle 1600 typically has a length of about 7 mm to about 30 mm (e.g., about 10 mm), a diameter of about 1.5 mm to about 3 mm (e.g., about 2.2 mm), and a wall thickness of about 0.2 mm to about 1 mm (e.g., about 0.5 mm). The handle body 1664 is typically manufactured via injection molding and may be made of one or more materials, such as polystyrene, polypropylene, polycarbonate, and other injection moldable resins. The cap 1666 is typically manufactured via injection molding or extrusion and may be made of one or more materials, such as polystyrene, polypropylene, polycarbonate, and other injection moldable or extrusion grade resins.

In some embodiments, the handle 1600 or a handle that is substantially similar in construction and function to the handle 1600 (e.g., but without the window 1672) can be used to house, store, and manipulate any of the above-discussed specimen containers.

In some embodiments, a specimen container includes a sieve for draining media from a distal end of the specimen container. For example, FIGS. 35 and 36 illustrate a specimen container 1700 including a sieve 1784. The specimen container 1700 further includes an elongate tube 1702, a proximal sharp tube 1704 that joins at the proximal end region of the elongate tube 1702 and a distal closure 1708 that hermetically seals a distal end 1710 of the elongate tube 1702. The elongate tube 1702 is a thin capillary tube of very small diameter (e.g., having an internal diameter on the order of $10^{-4}$ m). The elongate tube 1702 has a substantially constant diameter along a main portion 1714 (e.g., a cylindrical portion) and has a variable diameter that gradually decreases along a tapered portion 1716 that extends from the main portion 1714 to the distal end 1710.

The proximal member 1704 is a sharp tube with a blunt distal end and sharp proximal end. The proximal member 1704 is designed to slidably mate within a lumen of the elongate tube 1702 to seal the inner diameter of tube 1702 at the proximal end 1706 and to seal the access port 1762 of the elongate tube 1702. A vial 1750 (e.g., a vessel) contains the equilibration solution 120. During an initial centrifuge spin, the vial 1750 can be advanced to be pierced on the proximal member 1704 and to drain. The distal closure 1708 is a single-use seal (e.g., a melt seal, a fold, glue or adhesive, or another occluding member) that can be removed (e.g., cut or otherwise separated) from the distal end 1710 of the elongate tube 1702 to allow material to pass distally out of the elongate tube 1702.

A delivery device (e.g., such as a micropipette) may be used to deliver the specimen, suspended within a small amount of culture media, to the lumen of the elongate tube 1702 through the access port 1762. The specimen and a small volume of culture media may be deposited directly into the inner lumen of the elongate tube 1702.

The vial 1750 is biased (e.g., by centripetal force or by pushing) until the sharp tube 1704 pierces a frangible distal membrane of the vial 1750. Simultaneously, the same forces acting on the vial 1750 slide the sharp tube 1704 distally within the elongate tube 1702 until the access port 1762 is occluded by the distal, blunt, end of sharp tube 1704, thereby trapping the specimen and culture media. Upon piercing, the contents (e.g., equilibration solution 120) of the vial 1750 may drain through the lumen of sharp tube 1704 and into the closed internal volume of elongate tube 1702.

The sieve 1784 is a collection of holes 1786 (e.g., laser-drilled holes) that are arranged in multiple rows along the tapered portion 1716 of the elongate tube 1702. The sieve 1784 allows fluids (e.g., culture media, equilibration solution, vitrification solution, and other excess fluids) to drain distally from the specimen container 1700 during a spinning phase of a vitrification procedure, while a specimen is retained within the tapered portion 1716 of the elongate tube 1702 distal to the sieve 1784. The spinning phase of the vitrification procedure drains the excess fluid until the point where the specimen resides either within the sieve 1784 or slightly distal to the sieve in the vitrification solution 122 of the tapered portion 1716. The sieve 1784 typically has a total length of about 1 mm to about 5 mm and is spaced about 5 mm to about 20 mm from the distal end 1710 of the elongate tube 1702. Rows of the holes 1786 are typically spaced apart by about 0.1 mm to about 1 mm from each other, each hole 1786 typically has a diameter of about 10 μm to about 70 μm.

The main portion 1714 of the elongate tube 1702 typically has a length of about 20 mm to about 100 mm (e.g., about 50 mm), an outer diameter of about 1 mm to about 3 mm (e.g., about 1.8 mm), and a wall thickness of about 0.1 mm to about 1 mm (e.g., about 0.2 mm). The tapered portion 1716 of the elongate tube 1702 typically has a length of about 20 mm to about 50 mm (e.g., about 30 mm), a maximum outer diameter that is adjacent and equal to the outer diameter of the main portion 1714, a minimum outer diameter (e.g., at the distal end 1710 of the elongate tube 1702) of about 0.5 mm to about 2 mm (e.g., about 1 mm), and a wall thickness of about 0.1 mm to about 0.5 mm (e.g., about 0.2 mm). The proximal member 1704 has a length of about 20 mm to about 70 mm (e.g., about 50 mm).

The access port 1762 has an elliptical cross-sectional shape and has a width that is about equal to the diameter of the main portion 1714. The access port 1762 typically has a length of about 1 mm to about 10 mm (e.g., about 2.5 mm). A center of the access port 1762 is typically located about 5 mm to about 50 mm (e.g., about 10 mm) from the proximal end 1706 of the elongate tube 1702. A lumen of the elongate tube 1702, at a smallest inner diameter, is large enough to accommodate a specimen. A geometry and a construction (e.g., a thin and small profile) of the elongate tube 1702 are configured to maximize heat transfer and to minimize thermal mass to maximize cooling and warming rates of the specimen container 1700 during ART protocols. The specimen container 1700 typically has a total length (e.g., including lengths of the elongate tube 1702 and the distal closure 1708) of about 100 mm to about 200 mm (e.g., about 150 mm).

The proximal closure 1704 may be made of one or materials, including stainless steel hypodermic tubing. The elongate tube 1702 may be manufactured according to the processes discussed above with respect to the elongate tube 102 and formed from the same materials as those of the elongate tube 102, as discussed above. As further discussed with respect to the specimen container 100, the lumen of the elongate tube 1702 is internally preloaded with multiple fluids (omitted from FIG. 17 for clarity) located distal to the access port 1762, sequentially, starting adjacent to the distal end 1710 and moving proximally, the vitrification solution 122, and a separation fluid 124. The specimen container 1700 further includes the ID label 134 (omitted for clarity) attached to the elongate tube 1702 near the proximal end 1706.

Similar to the specimen container 100, the specimen container 1700 is a sterile, single-use device that is non-toxic to specimens contained therein. The specimen container 1700 may be individually packaged, and both the specimen container 1700 and the packaging will remain sterile for a guaranteed shelf-life of the specimen container 1700. The total length of the specimen container 1700 typically allows the specimen container 1700 to fit within standard storage containers and other standard equipment used in ART protocols.

In some embodiments, a handle can be used to house, store, and manipulate the specimen container 1700. For example, FIG. 34 illustrates such a handle 1800. The handle 1800 is substantially similar in construction to the handle 1600, except that a window 1872 of the handle is sized and positioned to align with the access port 1762 of the specimen container 1700. Accordingly, the handle 1800 includes a handle body 1864 and a cap that is formed to close the handle body 1864.

While the system console 200 has been described as including a reader component 208 that is positioned and programmed to detect a presence of the specimen container 100 within the receptacle 204, in some embodiments, a system console that is substantially similar to the system console 200 includes an additional reader component that is programmed and positioned at a suitable location to read the ID label 134 to detect a presence of the specimen container 100 within the cooler 210.

While the system console 200 has been described as including a single receptacle 204, in some embodiments, a system console that is substantially similar to the system console 200 includes multiple receptacles 204 that can each receive a specimen container and simultaneously spin multiple specimen containers.

Figure 38:
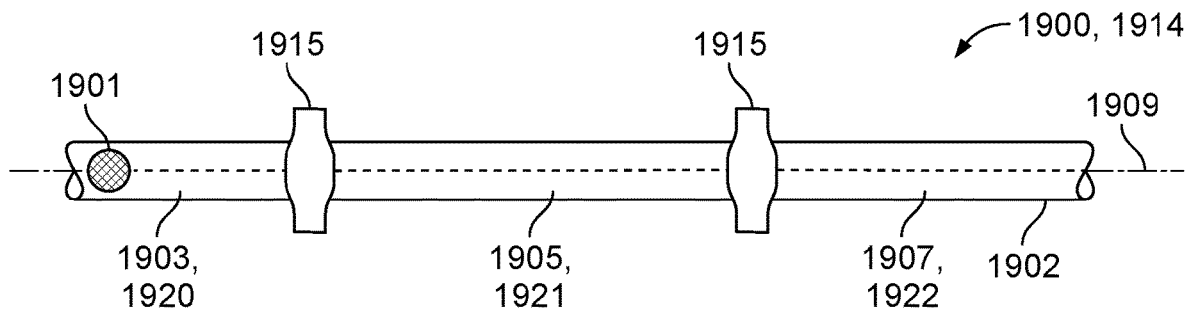
FIG. 38 is a perspective view of a specimen container including clips in a transverse orientation and in a closed state to define multiple fluid chambers within the specimen container.
Figure 39:
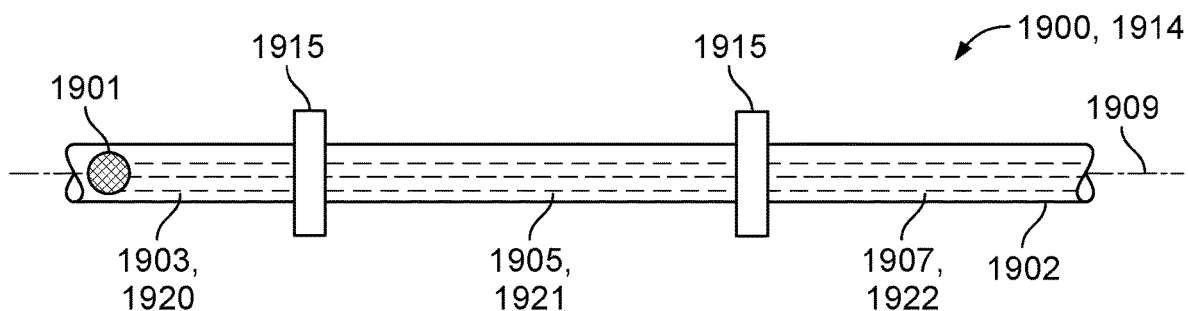
FIG. 39 is a perspective view of the specimen container of FIG. 38, with the clips in an open state to open up a lumen of the specimen container.

While the specimen container 100 has been described and illustrated as including the separation fluid 124 as a barrier between the equilibrium solution 120 and the vitrification solution 122 within the specimen container 100, in some embodiments, a specimen container includes a different type of barrier for separating solutions within the container. For example, FIGS. 38 and 39 illustrate a main portion 1914 of a specimen container 1900 that includes a different type of separation barrier.

The specimen container 1900 is similar in function and in some respects similar in construction to the specimen container 100. For example, as discussed above with respect to the specimen container 100, the specimen container 1900 can be used to prepare a specimen 1901 according to a biological or other protocol and to subsequently store the specimen 1901 in a low temperature substance in a viable and vitrified state. Furthermore, the specimen container 1900 is a sterile, single-use device that is non-toxic to specimens contained therein. The specimen container 1900 may be packaged as a single unit, and both the specimen container 1900 and the packaging will remain sterile for a guaranteed shelf-life of the specimen container 1900. A total length of the specimen container 1900 typically allows the specimen container 1900 to fit within standard storage containers and other standard equipment used in ART protocols.

The specimen container 1900 includes an elongate tube 1902 and two clips 1915 (e.g., mechanical crimping members) that are attached to the elongate tube 1902. The clips 1915 are attached at different positions to separate an equilibration solution 1920, a first vitrification solution 1921, and a second vitrification solution 1922 from each other within the elongate tube 1902. The elongate tube 1902 is a flexible member, and the clips 1915 are biased to a closed configuration during manufacturing of the specimen container 1900 such that the clips 1915 squeeze the elongate tube 1902 closed at selected locations to form hermetically sealed chambers 1903, 1905, 1907 that respectively contain the equilibration solution 1920, the first vitrification solution 1921, and the second vitrification solution 1922, as shown in FIG. 38.

For example, the clips 1915 are sequentially closed as the solutions 1920, 1921, 1922 are sequentially delivered to the elongate tube 1902. The clips 1915 are oriented perpendicular (e.g., transverse) to an axis 1909 of the elongate tube 1902. The specimen container 1900 also includes the ID label 134 (refer to FIG. 3) at a proximal end and includes proximal and distal closures that respectively, hermetically seal the proximal and distal ends (not shown) of the elongate tube 1902, as discussed above with respect to like components of the specimen container 100. The volumes, properties, and constituencies of the solutions 1920 and 1921, 1922 within the specimen container 1900 are equivalent to those of the solutions 120 and 122 discussed above with respect to the specimen container 100.

As discussed above with respect to the elongate tube 102, the elongate tube 1902 is a thin capillary tube of very small diameter and has a substantially constant diameter along the main portion 1914. The elongate tube 1902 has a variable diameter that gradually decreases along a tapered portion (e.g., similar to the tapered portion 116) that extends from the main portion 1914 to the distal end. The elongate tube 1902 is also sized as described above with respect to the elongate tube 102 and may be manufactured via plastic extrusion or other techniques and secondary manufacturing treatments (e.g., thermal stretching and reduction) to achieve the desired geometry. The elongate tube 1902 is typically made of one or more semi-elastic materials that can withstand the low temperature substance, including but not limited to polyolefins, polycarbonates, and polystyrenes. The elongate tube 1902 is also typically transparent or translucent to allow viewing of the specimen 1901 through the wall of the elongate tube 1902. The clips 1915 are typically made of one or more corrosion resistant and malleable materials that can suitably deform for closing and opening, such as stainless steel and aluminum.

During a process for vitrifying the specimen 1901 within the specimen container 1900, the proximal closure is removed from the elongate tube 1902, and a delivery device (e.g., such as the delivery device 103) is used to deliver the specimen 1901, suspended within a small amount of culture media to the equilibration solution 1920 through a proximal opening of the elongate tube 1902. The proximal closure is then reinstalled to the elongate tube 1902 to reseal the proximal opening for further processing of the specimen 1901 within a system console.

A system console in which the specimen container 1900 is disposed can be controlled to bias the clips 1915 to an open configuration (refer to FIG. 39) at the same time or in a timed sequence. The open configuration of a clip 1915 opens a lumen of the elongate tube 1902 to permit distal movement of the solutions 1920, 1921, 1922 and the specimen 1901 (e.g., with minimal friction along an inner surface of the elongate tube 1902) according to a specimen processing protocol in which g-forces are applied to the specimen container 1901. In some embodiments, the clips 1915 may be designed to be re-closeable for constraining a fluid volume within the elongate tube 1902 during or after processing of the specimen 1901 within the specimen container 1900.

Figure 40:
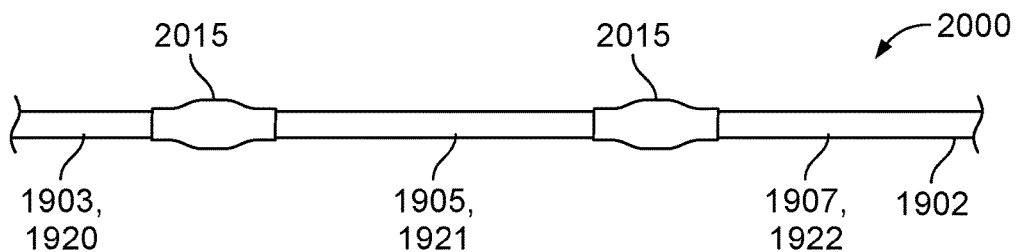
FIG. 40 is a perspective view of a specimen container including clips in an in-line orientation and in a closed state to define multiple fluid chambers within the specimen container.

While the specimen container 1900 has been described and illustrated as including the transversely oriented clips 1915, in some embodiments, a specimen container that is otherwise substantially similar in construction and function to the specimen container 1900 includes clips that are oriented parallel to an elongate tube of the specimen container. For example, FIG. 40 illustrates a specimen container 2000 including the elongate tube 1902 and clips 2015 that are oriented parallel to the axis 1909 of the elongate tube 1902. The specimen container 2000 is otherwise substantially similar in construction, function, and manner of use to the specimen container 2000, and the clips 2015 have the same material formulation as that of the clips 1915.

Figure 41:
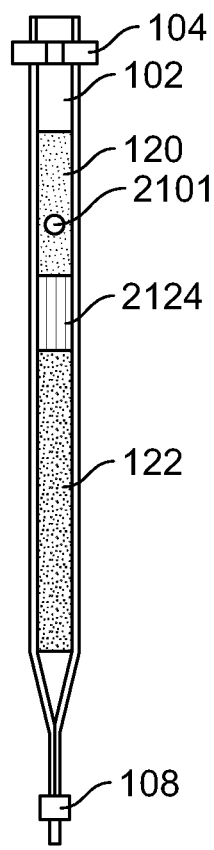
FIG. 41 is a side view of a specimen container that includes a separation barrier in a solid state.
Figure 42:
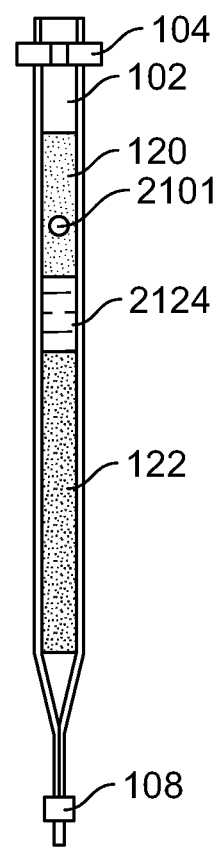
FIG. 42 is a side view of the specimen container of FIG. 41 with the separation barrier in a liquid state after undergoing a solid to liquid phase change.

While the specimen container 100 has been described and illustrated as including the fluid separation barrier 124 for separating the equilibration solution 120 from the vitrification solution 122, in some embodiments, a specimen container may include a solid solution separation barrier that can undergo a solid to liquid phase change within a lumen of the specimen container. For example, FIGS. 41 and 42 illustrate a specimen container 2100 that includes such a separation barrier 2124.

The specimen container 2100 is otherwise substantially similar in construction and function to the specimen container 100. For example, as discussed above with respect to the specimen container 100, the specimen container 2100 can be used to prepare a specimen 2101 according to a biological or other protocol and to subsequently store the specimen 2101 in a low temperature substance in a viable and vitrified state. Furthermore, the specimen container 2100 is a sterile, single-use device that is non-toxic to specimens contained therein. The specimen container 2100 may be packaged as a single unit, and both the specimen container 2100 and the packaging will remain sterile for a guaranteed shelf-life of the specimen container 2100. A total length of the specimen container 2100 typically allows the specimen container 2100 to fit within standard storage containers and other standard equipment used in ART protocols.

The specimen container 2100 includes the elongate tube 102, the ID label 134 (refer to FIG. 3), the proximal closure 104, the distal closure 108, the equilibration solution 120, and the vitrification solution 122 of the specimen container 100. The separation barrier 2124 between the solutions 120, 122 is an inert substance in a solid phase below a threshold temperature and undergoes a solid to liquid phase change when heated to at least the threshold temperature. In some embodiments, the threshold temperature is about 10° C. The specimen container 2100 is stored at a refrigeration temperature of about 4° C. such that separation barrier is in a solid state. When warmed to a room temperature of about 20° C., the separation barrier 2124 is in a liquid phase. The solutions 120, 122 are immiscible with the separation barrier 2124 in a liquid phase such that the solutions 120, 122 and the separation barrier 2124 will not mix to form a homogeneous solution.

Figure 43:
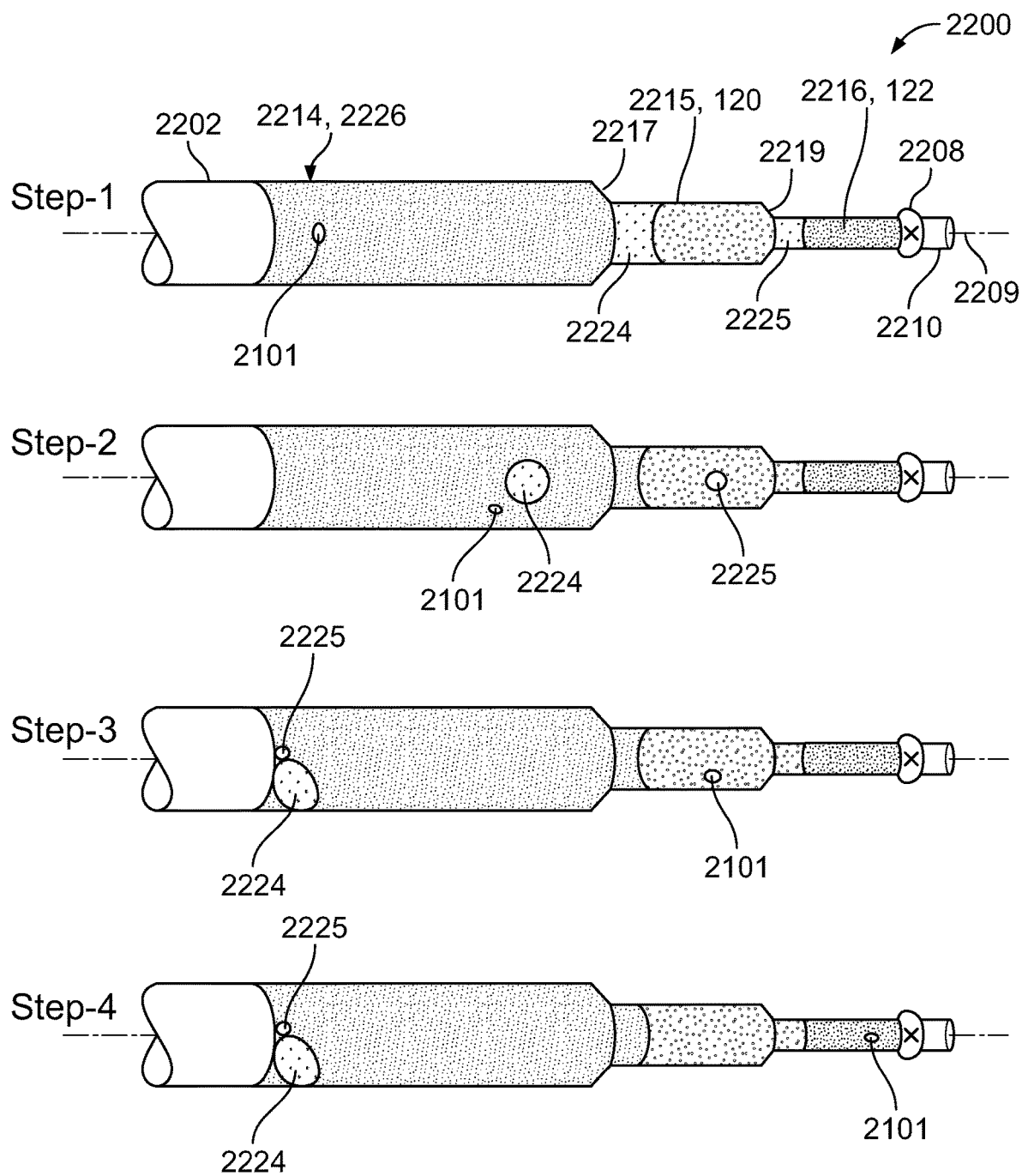
FIG. 43 provides side views of a specimen container with a diameter that varies in a stepwise manner according to volumes of separation barriers that have undergone a solid to liquid phase change.

Example substances of the separation barrier 2124 include alkanes, such as hexadecane (e.g., mineral oil or paraffin oil) and other alkanes (e.g., tetradecane through isocane) that melt from a solid to a liquid in a temperature range of about 0° C. (e.g., freezing) to about 37° C. (e.g., body temperature). In some embodiments, the separation barrier 2124 may alternatively be provided by other, non-straight chain polymers, such as decanoic acid and caprylic acid. FIG. 43 illustrates the separation barrier 2124 in a solid phase, and FIG. 42 illustrates the separation barrier 2124 in a liquid phase following heating of the specimen container 2100 to or above the threshold temperature (e.g., about 18° C. for hexadecane). A density of the separation barrier 2124 in the liquid phase (e.g., about 75 g/mL to about 79 g/mL for hexadecane) is less than that of both solutions 120, 122.

In some cases, including a gaseous solution barrier (e.g., air) within a specimen container introduces a possibility of undesired gas bubble formation within the specimen container. Providing the separation barrier 2124 as a solid substance (e.g., as opposed to a gaseous or liquid substance) within the specimen container 2100 advantageously enables packaging of the solutions 120, 122 in a separated state in a gas-free environment. Packaging the solutions 120, 122 in a gas-free environment can prevent the formation of air bubbles within the specimen container 2100. Such air bubbles may otherwise cause problems with processing the specimen 2100 within the specimen container 2100, such as obscuring visualization of the specimen 2100.

The specimen container 2100 can be used to process the specimen 2101 in the system console 200 as substantially described above with respect to the specimen 101 within the specimen container 100. During processing of the specimen 2100, with the separation barrier 2124 in a liquid state, g-forces exerted on the specimen container 2100 can cause the solutions 120, 122 and the separation barrier 2124 to move past each other to desired positions along the elongate tube 102 based on differences in density between the solutions 120, 122 and the separation barrier 2124. Movement (e.g., floatation) of the separation barrier 2124 away from its initial position in which the separation barrier 2124 continuously wets an inner surface of the elongate tube 102 (e.g., substantially about an entire circumference of the inner surface) opens up the lumen to permit movement of the solutions 120, 122 and the specimen 2101 distally within the elongate tube 102 according to the specimen processing protocol carried out by the system console 200. Such behavior will be explained in more detail below with respect to a specimen container 2200.

Referring to FIG. 43, the specimen container 2200 is similar in function to the specimen container 2200 and accordingly can be used to prepare a specimen 2201 according to a biological or other protocol and to subsequently store the specimen 2201 in a low temperature substance in a viable and vitrified state. Furthermore, the specimen container 2200 is a sterile, single-use device that is non-toxic to specimens contained therein. The specimen container 2200 may be packaged as a single unit, and both the specimen container 2200 and the packaging will remain sterile for a guaranteed shelf-life of the specimen container 2200. A total length of the specimen container 2200 typically allows the specimen container 2200 to fit within standard storage containers and other standard equipment used in ART protocols. The specimen container 2200 includes an elongate tube 2202, the identification label 134 (refer to FIG. 3), a proximal closure that hermetically seals a proximal end of the elongate tube 2202, and a distal closure 2208 that hermetically seals a distal end 2210 of the elongate tube 2202, as discussed above with respect to like components of the specimen container 100.

The elongate tube 2202 is a thin capillary tube that has a very small variable diameter that changes in a stepwise manner along an axis 2209 of the elongate tube 2202. The elongate tube 2202 is internally preloaded with a culture media 2226 in a main portion 2214, the equilibration solution 120 in an intermediate portion 2215, and the vitrification solution 122 in a distal portion 2216. Separation barriers 2224, 2225 separate the culture media 2226 and the solutions 120, 122 from each other. The main portion 2214 and the intermediate portion 2215 respectively define beveled wall sections 2217, 2219 that provide a transitional diameter between adjacent portions of the specimen container 2200 for facilitating distal fluid flow in the specimen container 2200 within a system console. In a temperature range of about 20° C. to about 40° C., the culture media 2226, the solutions 120, 122, and the separation barriers 2224, 2225 are all in a liquid phase. The culture media 2226 contains various nutrients and molecules in concentrations that maintain viability of the specimen 2201.

The elongate tube 2202 is dimensioned and a volume of the separation barrier 2224 is selected such that the separation barrier 2224 can continuously wet an internal surface of the intermediate portion 2215, but cannot continuously wet an internal surface of the main portion 2214. Similarly, the separation barrier 2225 can continuously wet an internal surface of the distal portion 2216, but cannot continuously wet the internal surfaces of the intermediate portion 2215 or the main portion 2214. Substance formulations of the separation barriers 2224, 2225 are the same as those of the separation barrier 2124. Accordingly, the separation barriers 2224, 2225 are inert substances in a solid phase below the threshold temperature and undergo a solid to liquid phase change when heated to at least the threshold temperature.

The volume of the equilibration solution 120 within the elongate tube 2202 is typically about 2 µL to about 20 µL, and the volume of the vitrification solution 122 within the elongate tube 2202 is typically about 2 µL to about 20 µL. The volume of the culture media 2226 within the elongate tube 2202 is typically about 2 µL to about 80 µL. Within the specimen container 2200, a density of the specimen 2201 is greater than the densities of the solutions 122, 222, which are greater than a density of the culture media 2226, which is greater than the density of the separation barriers 2224, 2225 in a liquid phase.

The main portion 2214 of the elongate tube 2202 typically has a length of about 10 mm to about 100 mm (e.g., about 50 mm) and an internal diameter of about 0.5 mm to about 6 mm (e.g., about 3 mm). The intermediate portion 2215 of the elongate tube 2202 typically has a length of about 5 mm to about 15 mm (e.g., about 10 mm) and an internal diameter of about 0.4 mm to about 2.5 mm (e.g., about 2 mm). The distal portion 2216 of the elongate tube 2202 typically has a length of about 5 mm to about 25 mm (e.g., about 15 mm) and an internal diameter of about 0.1 mm to about 1.0 mm (e.g., about 0.3 mm). The elongate tube 2202 typically has a wall thickness of about 0.03 mm to about 1 mm (e.g., about 0.08 mm). The elongate tube 2202 is manufactured via the techniques described above with respect to the elongate tube 102. The elongate tube 102 is typically transparent or translucent and is typically made of the same materials as those from which the elongate tube 102 is made.

During a process for vitrifying the specimen 2201 within the specimen container 2200, the proximal closure is removed from the elongate tube 2202, and a delivery device (e.g., such as the delivery device 103) is used to deliver the specimen 2201, suspended within a small amount of culture media 2226 to the culture media 2226 within the main portion 2214 of the elongate tube 2202 through a proximal opening. The proximal closure is then reinstalled to the elongate tube 2202 to reseal the proximal opening for further processing of the specimen 2201.

FIG. 43 illustrates a series of steps by which the specimen 2201 is processed within the specimen container 2200. Step 1 illustrates an initial state of the specimen container 2200 upon delivery of the specimen 2201 to the culture media 2226, in which state the specimen container 2200 has been pre-warmed to at least room temperature such that the barriers 2224 and 2225 are in a liquid phase. The specimen container 2200 is subsequently loaded in a rotatable receptacle within a system console for exposure to applied g-forces. Step 2 illustrates a next state of the specimen container 2200 following exposure to the applied g-forces within the system console. The g-forces urge the relatively dense specimen 2201 and fluids (e.g., the culture media 2226 and the solutions 2220, 2222) distally (e.g., to the right in FIG. 43) into adjacent portions of the specimen container 2200 and urges the relatively less dense fluid (e.g., the separation barriers 2224, 2225) proximally (e.g., to the left in FIG. 43). Accordingly, the liquid separation barriers 2224, 2225 separate from the internal surfaces of the intermediate and distal portions 2215, 2216 and migrate (e.g., float) proximally as droplets within the specimen container 2200.

Step 3 of FIG. 43 illustrates that with continued exposure to the applied g-forces, the fluids within the specimen container 2200 have arranged themselves in order of density, with the least dense fluid (e.g., the liquid separation barriers 2224, 2225) being positioned at a proximal region of the specimen container 2200 and the most dense fluid (e.g., the vitrification solution 2222) remaining at the distal closure 2208 of the specimen container. Step 4 illustrates that with further exposure to the applied g-forces, the specimen 2201 (e.g., the most dense substance within the specimen container 2200) has been driven into the vitrification solution 2222 near the distal closure 2208. The specimen container 2200, with the specimen 2201 contained therein, can be subsequently submerged in a low temperature substance for vitrification and storage of the specimen 2201.

Figure 44:
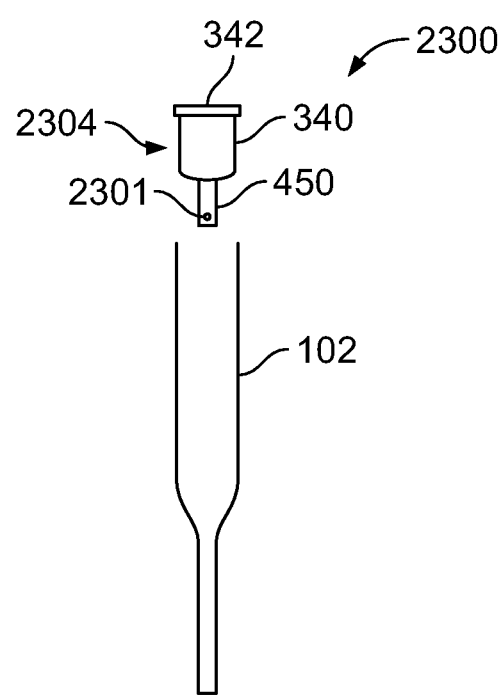
FIG. 44 is a side view of specimen container including a proximal closure that can deliver a specimen to the specimen container.

In some embodiments, a proximal closure of a specimen container can be used to deliver a specimen to the specimen container. For example, referring to FIG. 44, a specimen container 2300 includes such a proximal closure 2304. The specimen container 2300 is otherwise substantially similar in construction and function to the specimen container 300 described above. For example, the specimen container 2300 further includes the elongate tube 102. The proximal closure 2304 of the specimen container 2300 includes the plug 340 and the top flange 342 of the specimen container 300, as well as the specimen carrier 450 of the specimen container 400.

Figure 45:
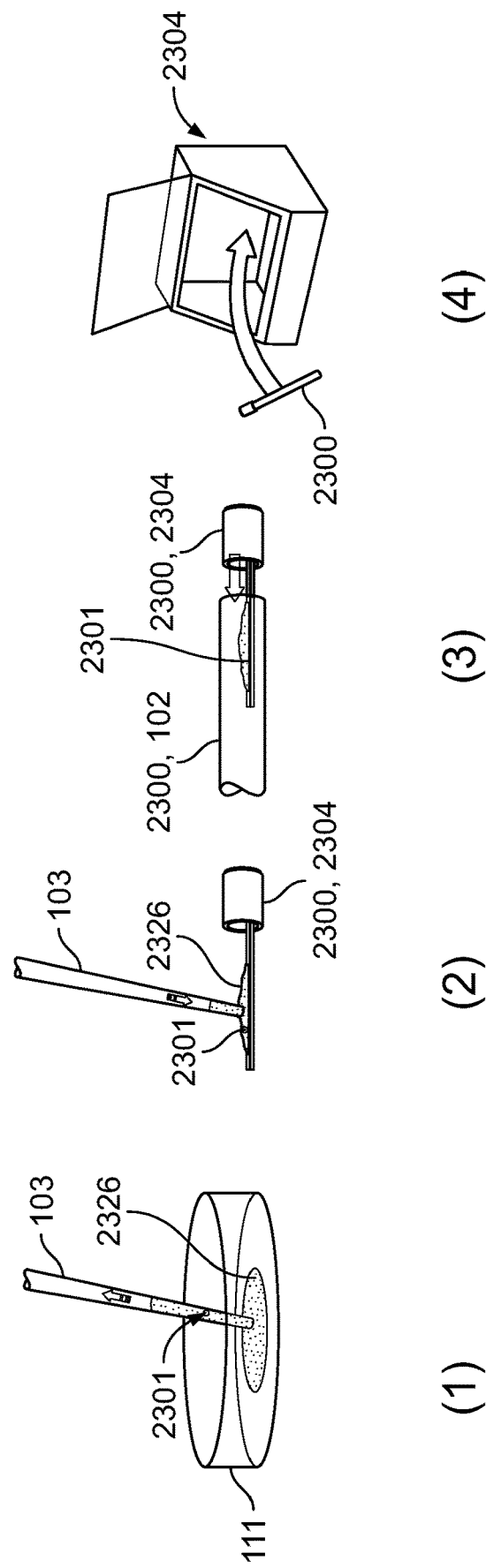
FIG. 45 illustrates a series of steps for using the specimen container of FIG. 44 to transfer a specimen from a culture dish to an automated vitrification system.

FIG. 45 illustrates a series of steps by which a specimen 2301 is loaded into the elongate tube 102 using the proximal closure 2304. In a first step, the delivery device 103 is used to aspirate (e.g., draw up) the specimen 2301 and a small amount of culture media 2326 from a petri dish 111. In a second step, the specimen 2301 and the culture media 2326 are delivered to the specimen carrier 450 of the proximal closure 2304. In a subsequent step, the proximal closure 2304, carrying the specimen 2301 atop the specimen carrier 450, is inserted within the elongate tube 102 to close the elongate tube 102. The specimen container 2300, carrying the specimen 2301, is subsequently placed within a system console 2325 for processing the specimen 2301 within the specimen container, as substantially described above with respect to processing of the specimen 101 within the specimen container 100.

Other embodiments of system consoles for processing a specimen within a specimen container are also possible. For example, FIG. 46 illustrates such a system console 2400 for processing a specimen within a specimen container 2401 that may represent any of the above-discussed specimen containers. The system console 2400 includes multiple processing stations 2402 for supporting respective specimen containers 2401 to carry out a specimen processing protocol, a platform 2404 to which the processing stations 2402 are secured, a housing 2406 that supports that platform 2404, handles 2408 for lifting or otherwise moving the system console 2400, and a lid 2408 that is openable to allow access to the processing stations 2402. The system console 2400 further includes a user interface screen 2412, multiple selectors 2414 (e.g., buttons) for setting various parameters of the system console 2400, and a power switch 2416 that are positioned along a front side of the housing 2406. The housing 2406 is configured to rest atop a floor or another flat surface. The lid 3410 is movable manually (e.g., pivotable, slidable, or removable) with respect to the housing 2406.

Additionally, the system console 2400 includes a timer 2418 (illustrated schematically), a reader component 2420 (e.g., an RFID antenna or another type of reader component, illustrated schematically) that is programmed to read the ID label 134 of a specimen container, and a control module 2422 (e.g., a microcontroller, illustrated schematically) that is programmed to control various features and functionalities of the system console 2400. The reader component 2420, the timer 2418, and the control module 2422 may be positioned at respective locations within the system console 2400 that are suitable for their respective functions. The user interface screen 2412 allows a user to input several parameters that govern operation of the system console 2400 to vitrify the specimen, such as a stage of the specimen (e.g., an oocyte or a blastocyst protocol selection). The user interface screen 2412 may be an integrated touchscreen or a touchless screen associated with tactile control elements, such as buttons, knobs, dials, or the like. The control module 2422 includes one or more processors that are in communication with and/or are programmed to control various actuators and sensors of the system console 2400 related to various automated features, such as receiving and instantiating user selections input at the user interface screen 2412, reading the ID label 134 of the specimen container 2401, executing the timer 2418, spinning the platform 2404 at a specified spin speed for a specified duration, detecting an open/closed state of the lid 2410, and providing audible and/or visual feedback regarding a progression of the process.

The platform 2404 defines multiple tracks 2426 at which a processing station 2402 can be secured in a fixed in position with respect to the platform 2404. Each processing station 2402 includes a lower support bracket 2428 and an upper support bracket 2430 that together define a receptacle 2432 for holding the specimen container 2401. Each processing station 2404 further includes an imaging system 2434 by which movement of the specimen within the specimen container 2401 can be observed. The reader component 2420 can detect a presence of the specimen container 2401 within the receptacle 2432 by reading the ID label 134 (e.g., the RFID tag) and can communicate such detection to the control module 2422, which can cause the timer 2418 to be activated.

According to one or more signals received from the control module 2422, the platform 2404 can spin about a central axis 2436 to exert enough centripetal force on the specimen to cause the specimen to move along an axis 2403 of the specimen container 2401 toward a distal end 2405 according to a specified protocol. During spinning of the platform 2404, the specimen and various processing media (e.g., equilibration and vitrification solutions and other media) within the specimen container 2401 can be visualized by the imaging system 2434. The control module 2422 can adjust an angular speed of the platform 2404 and/or a duration of one or more phases of the protocol based on feedback from the imaging system 2434 regarding a position of the specimen. Such protocol adjustments can optimize time periods of specimen exposure to the processing media within the specimen container 2401. Upon completion of the processing protocol, the specimen container 2401 is removed from the processing station 2402 and placed within a low temperature substance for vitrification and cryopreservation of the specimen contained within the specimen container 2401.

In some embodiments, the system console 2400 has a total length of about 0.2 m to about 1.0 m, a total width of about 0.2 m to about 1.0 m, and a total height of about 0.2 m to about 1.0 m. In some embodiments, the system console 2400 has a weight in a range of about 5 kg to about 50 kg and is typically stored on a laboratory floor, a storage facility floor, a table, or a countertop, that has an ambient environmental temperature of about 18° C. to about 28° C. In some embodiments, the receptacle 2432 of the processing station 2402 has a length of about 5 cm to about 15 cm and a width of about 1 cm to about 5 cm. The support brackets 2428, 2430 of the processing station 2402 and the platform 2404 are typically made of metal. The housing 2406 and the lid 2410 are typically made of materials that provide a degree of thermal insulation, such as polymers.

While the above-discussed specimen containers, handles, and system consoles have been described as including components with certain dimensions, sizes, shapes, materials, and configurations, in some embodiments, specimen containers, handles, and system consoles that are otherwise substantially similar in structure and function to the above-discussed embodiments may include one or more components with different dimensions, sizes, shapes, materials, and configurations.

What is claimed is:

1. A specimen container configured for cryogenic processing of a specimen, the specimen container comprising:
an elongate member;
an equilibration solution preloaded within a lumen of the elongate member at a first position;
a vitrification solution preloaded within the lumen of the elongate member at a second position located distal to the first position; and
a barrier positioned between the equilibration and vitrification solutions such that the equilibration and vitrification solutions are spaced apart from each other within the lumen of the elongate member.

2. The specimen container of claim 1, wherein the elongate member comprises a capillary tube.

3. The specimen container of claim 1, wherein the elongate member comprises a first portion having constant width and a second portion having a variable width.

4. The specimen container of claim 3, wherein the second portion is a tapered portion.

5. The specimen container of claim 1, wherein the vitrification solution is denser than the equilibration solution.

6. The specimen container of claim 1, wherein the equilibration solution has a volume of about 1 µL to about 50 µL.

7. The specimen container of claim 6, wherein the vitrification solution has a volume of about 1 µL to about 50 µL.

8. The specimen container of claim 1, further comprising one or more additional equilibration solutions and/or one or more additional vitrification solutions.

9. The specimen container of claim 1, wherein the barrier comprises a fluid.

10. The specimen container of claim 9, wherein the fluid comprises air.

11. The specimen container of claim 1, wherein the barrier comprises a valve.

12. The specimen container of claim 1, wherein the barrier comprises an inert solid that undergoes a solid to liquid phase change at a temperature of about 10° C.

13. The specimen container of claim 12, wherein the barrier, in a liquid phase, is less dense than the equilibration solution and the vitrification solution.

14. The specimen container of claim 1, wherein the barrier comprises a crimping member disposed external to the elongate member.

15. The specimen container of claim 14, wherein the elongate member comprises a flexible tube.

16. The specimen container of claim 1, wherein a diameter of the elongate member varies in a stepwise manner along an axis of the elongate member.

17. The specimen container of claim 1, further comprising an electronic identification label.

18. The specimen container of claim 1, wherein a proximal end of the elongate tube and is wider than a central portion of the elongate tube.

19. The specimen container of claim 1, wherein the elongate tube defines a sidewall opening located proximal to the first processing medium.

20. The specimen container of claim 1, further comprising a plug configured to fit within the lumen of the elongate tube and a specimen carrier that extends from the plug.

21. The specimen container of claim 1, wherein one or both of the equilibration solution and the vitrification solution comprise magnetic nanoparticles.

22. The specimen container of claim 1, wherein the specimen container is formed of a material that can mechanically withstand a temperature of about −196° C. or less for at least about 15 years.

23. The specimen container of claim 1, wherein the specimen container is configured for vitrification of the specimen within the lumen of the elongate member.

24. A cryogenic device comprising:
a specimen container configured for cryogenic processing of a specimen, the specimen container comprising:
an elongate member,
an equilibration solution preloaded within a lumen of the elongate member at a first position,
a vitrification solution preloaded within the lumen of the elongate member at a second position located distal to the first position, and
a barrier positioned between the equilibration and vitrification solutions such that the equilibration and vitrification solutions are spaced apart from each other within the lumen of the elongate member; and
a handle configured to house the specimen container.

25. A vitrification system, comprising:
a processing station, comprising:
a receptacle configured to securely hold a specimen container configured for cryogenic processing of a specimen, wherein the specimen container comprises:
an elongate member,
a first specimen processing medium contained within a lumen of the elongate member at a first position,
a second specimen processing medium contained within the lumen of the elongate member at a second position located distal to the first position, and
a barrier positioned between the first and second specimen processing mediums such that the first and second specimen processing mediums are spaced apart from each other within the lumen of the elongate member, and
an imaging system disposed above the receptacle for visualizing the specimen within the specimen container; and
a rotatable platform to which the processing station is secured for applying a centripetal force to the specimen within the specimen container.

26. A method of cryogenically processing a specimen within a specimen container, the method comprising:
depositing the specimen within a lumen of the specimen container;
exposing the specimen to an equilibration solution preloaded within the lumen for a predetermined period of time;
forcing the specimen distally through the equilibration solution and toward a vitrification solution spaced apart from the equilibration solution and preloaded within the lumen;
exposing the specimen to the vitrification solution; and
forcing the specimen distally through the vitrification solution.

27. A specimen container configured for cryogenic processing of a specimen, the specimen container comprising:

an elongate member;

a first specimen processing medium contained within a lumen of the elongate member at a first position;

a second specimen processing medium contained within the lumen of the elongate member at a second position located distal to the first position; and a valve positioned between the first and second specimen processing mediums such that the first and second specimen processing mediums are spaced apart from each other within the lumen of the elongate member.

28. A specimen container configured for cryogenic processing of a specimen, the specimen container comprising:

an elongate member;

a first specimen processing medium contained within a lumen of the elongate member at a first position;

a second specimen processing medium contained within the lumen of the elongate member at a second position located distal to the first position; and an inert solid positioned between the first and second specimen processing mediums such that the first and second specimen processing mediums are spaced apart from each other within the lumen of the elongate member, wherein the inert solid undergoes a solid to liquid phase change at a temperature of about 10° C.

29. A specimen container configured for cryogenic processing of a specimen, the specimen container comprising:

an elongate member;

a first specimen processing medium contained within a lumen of the elongate member at a first position;

a second specimen processing medium contained within the lumen of the elongate member at a second position located distal to the first position, wherein one or both of the first and second specimen processing mediums comprise magnetic nanoparticles; and a barrier positioned between the first and second specimen processing mediums such that the first and second specimen processing mediums are spaced apart from each other within the lumen of the elongate member.

* * * * *